(12) United States Patent
Wang

(10) Patent No.: US 11,149,633 B2
(45) Date of Patent: Oct. 19, 2021

(54) SYSTEM OF USING COMPRESSED AIR AS A FORCE SOURCE AND METHOD THEREOF; AIRPLANE

(71) Applicant: Lifeng Wang, Spånga (SE)

(72) Inventor: Lifeng Wang, Spånga (SE)

( * ) Notice: Subject to any disclaimer, the term of this patent is extended or adjusted under 35 U.S.C. 154(b) by 472 days.

(21) Appl. No.: 16/082,195

(22) PCT Filed: Jan. 16, 2017

(86) PCT No.: PCT/SE2017/000005
§ 371 (c)(1),
(2) Date: Sep. 4, 2018

(87) PCT Pub. No.: WO2017/151029
PCT Pub. Date: Sep. 8, 2017

(65) Prior Publication Data
US 2020/0325820 A1 Oct. 15, 2020

(30) Foreign Application Priority Data
Mar. 4, 2016 (CN) ................... ZL201620169386.3

(51) Int. Cl.
*F02C 1/04* (2006.01)
*B64C 15/14* (2006.01)
(Continued)

(52) U.S. Cl.
CPC ............... *F02C 1/04* (2013.01); *B64C 15/14* (2013.01); *B64D 27/18* (2013.01); *B64D 27/20* (2013.01); *B64D 41/00* (2013.01); *F02C 7/04* (2013.01)

(58) Field of Classification Search
CPC ... F02C 1/04; F02C 7/04; B64C 15/14; B64D 27/18; B64D 27/20; B64D 41/00
See application file for complete search history.

(56) References Cited

U.S. PATENT DOCUMENTS 3,265,330 A * 8/1966 Conway .............. B64C 29/0058
244/23 D
3,302,602 A 2/1967 Alexandre
(Continued)

FOREIGN PATENT DOCUMENTS

CN 101050726 10/2007
CN 102877983 1/2013
(Continued)

OTHER PUBLICATIONS

Extended European Search Report from European Application No. 17760385.9, dated Oct. 9, 2019, 7 pages.

*Primary Examiner* — Justin M Benedik
(74) *Attorney, Agent, or Firm* — Morgan, Lewis & Bockius LLP

(57) ABSTRACT

The present invention provides a system of using compressed air as force source, comprising: compressed air jet engines, which use high/ultra-high pressure compressed air as a jet working medium, a compressed air production/supply device to economically, environmentally and quantitatively produce, store and supply the high/ultra-high pressure compressed air, and a controller. The compressed air jet engines are equipped on an airplane, rocket, submarine, train, or other moving carrier for aviation, aerospace, navigation and/or ground travel, comprising an air tank and air engines for generating power. The air engines comprise a main air engine for generating thrust, and a plurality of auxiliary air engines for reducing the air (or seawater) resistance and the sliding friction with air (or seawater) during the carrier movement to facilitate the speed-rising and energy-saving, and for improving the lift force of airplane wings to facilitate airplane short-range or vertical take-off/landing, etc.

14 Claims, 4 Drawing Sheets

(51) Int. Cl.
    *B64D 27/18* (2006.01)
    *B64D 27/20* (2006.01)
    *B64D 41/00* (2006.01)
    *F02C 7/04* (2006.01)

(56) References Cited

U.S. PATENT DOCUMENTS

| | | | |
|---|---|---|---|
| 4,224,790 A | 9/1980 | Christensen | |
| 5,141,173 A * | 8/1992 | Lay | B60L 1/003 |
| | | | 244/2 |
| 6,517,026 B1 * | 2/2003 | Smith | B60F 3/00 |
| | | | 244/2 |
| 2011/0041501 A1 | 2/2011 | Gerard | |
| 2013/0068876 A1 * | 3/2013 | Radu | B60F 5/02 |
| | | | 244/2 |
| 2018/0283275 A1 * | 10/2018 | Matsukuma | F02C 1/05 |
| 2019/0170026 A1 * | 6/2019 | Matsukuma | F02C 1/04 |

FOREIGN PATENT DOCUMENTS

| | | |
|---|---|---|
| CN | 104948234 | 9/2015 |
| CN | 205559070 | 9/2019 |
| KR | 20100046754 | 5/2010 |

* cited by examiner ions into the thrust, consisting of propellant nozzle, combustion
SYSTEM OF USING COMPRESSED AIR AS A FORCE SOURCE AND METHOD THEREOF; AIRPLANE This application is a national stage application of PCT/SE2017/000005 filed on Jan. 16, 2017, which claims the priority of Chinese Patent Application No. ZL201620169386.3, filed on Mar. 4, 2016. The disclosure of each of the foregoing applications is incorporated herein in its entirety by reference.

TECHNICAL FIELD

This invention relates to the field of engine technology, particularly providing a system of using compressed air as a force source and method thereof, more specifically an airplane.

BACKGROUND TECHNOLOGY

Engine is a machine capable to convert other forms of energy into mechanical energy. Born in Britain, it has gone through the development stages of external and internal combustion engines in succession. For external combustion engines, a fuel burns in the external part of the engine, such as steam engines. For internal combustion engines, a fuel burns in the internal part of an engine, such as a type of gasoline, diesel and jet engines. In fact, whether an engine has external or internal combustion, the combustion effect is to produce a "high-temperature and high-pressure" gas to work in the engine. Analyzing the direct effects of "high temperature" and "high pressure", people in the field has known that "high temperature" effect mainly results in increasing the gas pressure in the engine according thermodynamics, while "high pressure" effect is directly related to the mechanical work, determining the magnitude of output torque (e.g. steam engines, gasoline engines, and diesel engines) or thrust (e.g. jet engines).

For the torque as a steam, gasoline or diesel engine outputs by fuel combustion to produce a "high pressure" gas as its power, an authorized patent "A System for Economical Use of Compressed Air as an Automobile Power Source and Method Thereof" (Patent No. ZL201520365135.8, PCT/SE2016/000030, Inventor: Lifeng Wang) discloses a compressed air power device (including the automobile air storage tubes and cylinder-combined engines) using "high pressure" compressed air as a power source to output torque for generating the driving force.

For the thrust as a jet engine outputs by fuel combustion to produce a "high pressure" gas as its power, the present invention aims at exploring the use of "high pressure" compressed air as a power source to output thrust, and providing a system of using compressed air as a force source.

For the existing technology of jet engines, there are a variety of classifications, usually in two categories, aviation jet engines and rocket engines. Among aviation jet engines, the turbojet engines (Turbojet) are hereby representative though they can further be subdivided into more specific types, such as, centrifugal turbojet, axial flow turbojet, turbofan, ramjet, and pulsejet. The rocket engines include chemical rocket, electric rocket, nuclear rocket, and solar rocket among others. The chemical rocket engines have been currently developed in more mature and wider application, so that the rocket engines generally refer to the chemical rocket engines, which can be classified into liquid rocket engines and solid rocket motors.

Wherein, the turbojet include $\hat{1}$ intake channel, through which air enter a compressor in next structure; $\hat{2}$ compressor, consisting of stator blades and rotor blades in staggered composition, where a pair of stator and rotor blades is termed as one grade (usually 8-12 grades), where the stator fixed to the engine frame while the rotor with its shaft connected to the turbine; $\hat{3}$ combustion chamber and turbine where air, after compressed by the compressor, enters the combustion chamber for mixing with the fuel to burn, producing the high-temperature and high-pressure gas for expansion to do work, and flowing through the turbine to drive it (most of modern fighters have an afterburner installed after the turbine to increase engine thrust); $\hat{4}$ nozzle (also known as muzzle), which shape and structure of convergence, convergence-divergence tube determine the final state of the exhaust gas stream. Liquid rocket engines are those using a liquid propellant, typically including $\hat{1}$ main push ejector, an important component to convert chemical energy of the liquid propellant (fuel and oxidizer) into the thrust, consisting of propellant nozzle, combustion chamber and nozzle assemblies among others (fuel and oxidizer get atomization through the propellant nozzle to spray into the combustion chamber where mixing-burning and producing a high-temperature and high-pressure gas ejecting out from the nozzle assembly); $\hat{2}$ propellant supply system, consisting fuel and oxidizer tanks, fuel and oxidizer pumps, fuel and oxidant delivery pipes and valves among others; $\hat{3}$ engine control system, collaboratively consisting of computerized controller and sensors measuring various parameters of the engine system, various types of valves and regulators; and $\hat{4}$ ignition device (ignition as soon as the propellant enters the combustion chamber) among others. Solid rocket motors are those using a solid propellant, including $\hat{1}$ grain (propellant charge), $\hat{2}$ combustion chamber (casing), $\hat{3}$ the nozzle assembly, and $\hat{4}$ ignition device among others. The grain is a hollow cylinder (hollow part is the combustion section, with a cross-section in circular, star or other shape) made of a solid propellant (fuel and oxidizer) well mixed in advance, loaded directly into a storage chamber, which is the combustion chamber when working, where the propellant burns to produce a high-temperature and high-pressure gas; the nozzle assembly consists of nozzle and thrust vector control system; the ignition device usually consists of electrical ignition tube and gunpowder cartridge to ignite the grain. A rocket engine uses the above-mentioned special structure—the half-closed combustion chamber is connected to the nozzle (de Laval nozzle), a structure giving the burning gas only single way—flowing to the direction of nozzle, while other directions are restricted. Therefore, the gas within the combustion chamber can establish a certain pressure (1~20 MPa), while the pressure outside the nozzle is only 0.1 MPa (sea-level atmospheric pressure) or less than 0.1 MPa or even zero (at high altitude or even beyond atmosphere), so that, under the action of difference between internal and external pressures, the gas flows to the nozzle and ejects out at a high velocity. The "high-temperature and high-pressure" gas is produced within the jet engine combustion chamber mentioned above, and gets an action force applied by the inner wall of the engine combustion chamber under "high pressure" to flow to the nozzle. According to Newton's third law, the gas leaving from the engine must give a counteraction to the engine, which is the thrust of the engine. The higher the "high pressure", generally the better the engine performance, and the greater the thrust.

The existing technology jet engine carry its own propellant (fuel or fuel plus oxidant) and combustion-related facilities, which is relevant to the problems of the engines of heavier weight, complex structure, difficulty in control, high cost, and difficulties in research, development and production. For instance, an aviation jet engine carries its own fuel oil, and also the multi-stage compressor, multi-stage turbine, multi-stage fan and others installed for its need to take air from the atmosphere as the oxidant to react with the fuel oil for combustion, which increases not only the weight but also greatly the difficulties in research, development and manufacture. The difficulties reach such an extent that: the first class turbofan engine technology in the world is mastered just by a few companies, such as Rolls-Royce Group plc, LSE: RR in UK, Pratt & Whitney and GE aviation in USA.

Tsiolkovsky (Константин Эдуардович Циолковский, 1857-1935), is considered to be one of the founding fathers of rocketry and astronautics, the first who proposed that Mass Ratio, the ratio of the rocket's initial mass to its final mass, is used to measure the efficiency of a rocket. He calculated that mass ratio is 23.5 for a rocket using nitric acid and hydrazine type propellants to reach the first cosmic speed, meaning that a rocket with total weight of 100 tons requires 96 tons of propellant; if coupled with gravity factor, the mass ratio will be even greater, i.e. the ratio of its payload to take-off mass will be further smaller. On the research and development for promoting the ratio of the payload mass to the take-off mass in the field of aviation and aerospace, two authorized patents "A Device for Launching Warheads of High Launched Velocity" (Patent No. ZL201420224494.7, PCT/SE2015/000021, Inventor: Lifeng Wang) and "A Rotary Flywheel for Cargo Transportation and Its Control Method" (Patent No. ZL201110351539.8, inventor: Lifeng Wang) have respectively disclosed a device for launching payload, and a rotary flywheel for cargo transportation, respectively capable to use the high-speed rotation of a flywheel to eject the payload at a high speed, and to reduce the transportation difficulty related to the payload weight, which mainly involve the use of principles and technical approaches of flywheel beyond the field of the rocket technology. How to reduce the rocket mass ratio, or on the other hand how to improve the ratio of rocket payload to its take-off mass, has always been a subject to be solved for the people in the field. From some data about the ratio of the payload to take-off mass of the current carrier rockets, one can see some: Israel's Shavit payload accounted for 0.7% of take-off mass, India's Polar Satellite Launch Vehicle carried a satellite accounting for 1%, Japan's H Launch Vehicles payload accounted for 0.7%, US's Saturn payload for 1.6%, Russia' Proton satellite for 0.3%, China's Long March V payload for about 2%, and so on, apparently that the ratio of propellant and its combustion related facilities occupying the take-off mass is really quite high (about 98-99%).

It is an indisputable common sense that compressed air can also generate thrust. In the current rocket technology, compressed air is mainly used in the cool gas propulsion technology for attitude and orbit control, as one of attitude and orbit control propulsion technologies. Attitude and orbit control propulsion techniques usually involve chemical propulsion, cool gas propulsion, electric propulsion, nuclear propulsion, momentum transfer propulsion and non-working medium propulsion system among others, to accomplish three functions: attitude control (maintaining flight vehicle aiming at the designated direction), keeping track (maintaining flight vehicle travelling on the designated track) and orbit transfer (enabling flight vehicle to move from the current track to another designated track). Wherein a cool gas propulsion system, i.e. cool gas propulsion technology for attitude and orbit control, generally uses compressed gas (such as air, nitrogen, helium, carbon dioxide, etc.) as the jet working medium. A typical cool gas propulsion system usually outputs a thrust in a range of 0.05N~22N, providing a thrust or torque required for spacecraft attitude control, orbit transfer and keeping track. The technology of Microelectromechanical system (MEMS) used in cool gas propulsion systems is easy to implement system miniaturization and integration, constituting the micro propulsion device, with the rapid development of microelectronics, micromechanical, lightweight composite materials and ultra-precision machining and other basic industries, may be integrally mounted on the mounting bulkhead for easy installation and replacement, and as the cool gas micropropulsion system, it has been successfully applied to the practice and research on cool gas propulsion system for micro- and nano-satellites (usually, satellites in weight>1000 kg called Large satellite, weight of 500 kg~1000 kg Medium satellite, 100 kg~500 kg Mini satellite, 10 kg~100 kg Micro satellite, and 1 kg~10 kg Nano satellite, 0.1 kg~1 kg Pico satellite, <0.1 kg Femto satellite). The current cool gas propulsion systems, as an attitude and orbit control propulsion technology while analyzing its functional features on one hand, have got no need to use a lot of high/ultra-high pressure compressed air as a main thrust of the rocket, and while analyzing its structural features on the other hand, there has been no technical feature nor report on a main jet engine of any rocket using a lot of compressed air as its force source.

It is reasonable to assume that, even not relying on the "high temperature" resulting from the oxidation combustion of its own curried fuel to produce "high-pressure" gas, an engine that uses a lot of its own carried high-pressure compressed air as a jet working medium may also provide the thrust. Wherein an airborne device can store a sufficient amount of high/ultra-high pressure compressed air to supply the engine as a working medium, hereby simplified as "air tank", referred to the structure and function of the automobile air storage tubes involved in a patent "A System for Economical Use of Compressed Air as an Automobile Power Source and Method Thereof" (Patent No. ZL201520365135.8, PCT/SE2016/000030, inventor: Lifeng Wang) with improvement in design. While for the engine of using high/ultra-high pressure compressed air for expansion work, hereby simplified as "compressed air jet engine", and its structure and function (such as expansion chamber and nozzle), one can refer to the traditional jet engines structure and function (such as combustion chamber and nozzles) for liquid rocket with improvement of the design. So-called compressed air jet engines of using high/ultra-high pressure compressed air as the working medium provides thrust according to Newton's law (mainly Third Law, as well as Second Law), and can be used for airplane, rockets, ships, vehicles and other moving carriers.

For comparison, the traditional jet engine nozzles that should not be nearby, even less to face the moving carrier itself, because the scorching hot gas ejecting from the nozzles may ablate the surface of the carrier or at least increase the thermal fatigue of the carrier structure, causing severe consequence; while the temperature of the airflow ejecting from the compressed air jet engine nozzles is not so high, such ejected high-speed airflow can be quite close and parallel to the surface of the moving carrier, can be directly blowing over the upper surface of the wings, even can be at a certain distance and in a range of certain angles sloped against the surrounding of the head of the moving carrier, without taking into account the ablative damage to the moving carrier. Moreover, the nozzles of a traditional jet engine, due to its close relevance to the fuel combustion, usually appear only in the ordinary positions for installation of a main engine, such as at the rear part of the moving carrier, or beneath the wings, while the nozzles of a compressed air jet engine can not only appear in those ordinary positions, but also actually be installed in almost any of required places surrounding the moving carrier, just needing to get an intake pipe of high/ultra-high pressure compressed air communicating there. On one hand, therefore, according to Bernoulli principle that "the air or water flow rate is increased, the air or water pressure is decreased" proposed by Daniel Bernoulli (1700-1782, Father of Fluid Dynamics), and Coanda effect, the nozzles of compressed air jet engine may be installed on the front part of a moving carrier, its body surroundings, front of wings among others, where to eject high-speed airflow, affecting the relevant local aerodynamic changes, sharp drop in air density and pressure, which can produce hydrodynamic effects on the movement of the moving carrier, to get these compressed air jet engines, in addition to the aforementioned thrust, the functions of reducing the running resistance such as air resistance and friction, and increasing wing lifting force, etc. On the other hand, the nozzle of the compressed air jet engines can be placed downward beneath an airplane fuselage to produce certain vertical upward thrust in favor of short-distance takeoff, or forward beneath the fuselage tail or on its both sides to eject airflow at a certain rate for buffering and deceleration of the travelling airplane in favor of short-distance landing. It can be described as all-round and multi-functional.

Obviously, for the airborne "air tank" of compressed air for the proposed compressed air jet engines, there is no lack of a device for production, storage and supply of high/ultrahigh pressure compressed air, hereby simplified as "compressed air production/supply device", for inflating air into "air tank" of the compressed air jet engine. It is well known that the costs of high/ultra-high pressure compressed air production are very high, mainly because about 90% of the electric power consumed during the production is converted into thermal energy wasted. While recovery and reuse of this part of thermal energy can be referred to the structure and function of a boiler-type device producing and storing high-pressure compressed air involved in a previous patent "A System for Economical Use of Compressed Air as an Automobile Power Source and Method Thereof" (Patent No. ZL201520365135.8, PCT/SE2016/000030, inventor: Lifeng Wang) with improvement in design. In addition, the improvement in design of "compressed air production/supply device", because the "air tank" of the compressed air jet engine for airplane and other moving carriers has a much larger storage capacity and higher pressure of compressed air than those used for automobile air storage tubes involved in the previous patent "A System for Economical Use of Compressed Air as an Automobile Power Source and Method Thereof" (Patent No. ZL201520365135.8, PCT/SE2016/000030, inventor: Lifeng Wang), needs to adapt to economically produce and store more capacity and higher pressure of high/ultrahigh pressure compressed air for pressurization and inflation of the compressed air into the "air tank" of the compressed air jet engine, and also to solve the problems with efficiency of the pressurization and inflation. For instance, during the pressurization and inflation of the compressed air by the "compressed air production/supply device" into the "air tank" of the compressed air jet engine, the designated air pressure of the "air tank" is also very high, and when the pressure of the compressed air in the "compressed air production/supply device" drops to the extent equal to the air pressure in the "air tank" of the compressed air jet engine, there is a problem with that a large amount of high pressure compressed air remaining in the "compressed air production/supply device" cannot be utilized. It must have a design to match the "compressed air production-supply device" with the "air tank" of the compressed air jet engine, for a system including the "compressed air production/supply device", the airborne "air tank", the compressed air jet engine using the compressed air as a force source.

CONTENTS OF THE INVENTION

1, Technical Problem to be Solved

The technical problem to be solved is the economical use of high/ultrahigh pressure compressed air as force source, to provide a compressed air jet engine arranged on a moving carrier of aviation, aerospace, navigation and ground vehicles such as an airplane, a rocket, a submarine, a train or the like, using the compressed air as a jet working medium, for generating thrust, reducing air (or seawater) resistance, improving airplane wings lift, and to facilitate the speed-rising and energy-saving.

2, Technical Solutions

In order to solve the above technical problem, this invention provides a system of using compressed air as force source, comprising compressed air jet engines to use high/ultra-high pressure compressed air as a jet working medium, a compressed air production/supply device and a controller;

In this invention, the compressed air jet engines are equipped on a moving carrier, comprising an air tank and air engines; the air tank is a compressed air storage container, including a plurality of air storage pipes to store and supply the compressed air needed for the air engines; the air engines comprise a main air engine and a plurality of auxiliary air engines; the main air engine is to use the compressed air input from the air storage pipes as the jet working medium for applying a thrust to the moving carrier moving forward; the plurality of auxiliary air engines arranged respectively around the moving carrier include first auxiliary air engine, second auxiliary air engine, third auxiliary air engine, fourth auxiliary air engine and fifth auxiliary air engine, to use the compressed air input from the air storage pipes as the jet working medium, in coordination with the main air engine for pushing the moving carrier moving toward the target direction.

In this invention, the compressed air production/supply device comprises a high/ultrahigh pressure air compressor and a large boiler-type pressure vessel; the working pressure of the high/ultrahigh pressure air compressor is close to, equal to or more than 100 Mpa, for pressurizing and inflating air into the large boiler-type pressure vessel under the control of the controller; the large boiler-type pressure vessel is used to produce and store the compressed air for pressurizing and inflating the compressed air into plurality of the air storage pipes.

In this invention, the controller is used to control the opening and closing of the main air engine, first auxiliary air engine, second auxiliary air engine, third auxiliary air engine, fourth auxiliary air engine s and fifth auxiliary air engine for pushing the moving carrier moving toward the target direction.

Preferably, each of the main air engine, first auxiliary air engine, second auxiliary air engine, third auxiliary air engine, fourth auxiliary air engines and fifth auxiliary air engine comprises a high pressure-resistant, lighter material intake pipe, an expansion chamber and de Laval nozzle;

wherein, the intake pipe is connected to the air storage pipe and the expansion chamber, and surrounded with an intake pipe electric heater, for heating the compressed air in the intake pipe to increase the air pressure within the intake pipe; the compressed air in air storage pipe is injected into the expansion chamber through the air injection vent of intake pipe;

wherein, the expansion chamber wall of expansion chamber is equipped with an air injection adjuster for modulating the amount of compressed air at a set pressure injected from the intake pipe into the expansion chamber to maintain the pressure within the expansion chamber at the set pressure; surrounding the expansion chamber there is a expansion chamber wall electric heater to heat the compressed air entering the expansion chamber for pressurization;

wherein, the cross-sectional area of de Laval nozzle is first converged and then diverged; the rear of the expansion chamber is integrally connected with de Laval nozzle convergent section; the compressed air from the expansion chamber is accelerated under pressure to pass through de Laval nozzle convergent section, de Laval nozzle throat and de Laval nozzle divergent section, and at last a high-speed airflow is ejected from de Laval nozzle orifice.

Preferably, first auxiliary air engine is equipped at the front of the moving carrier head; the cross section area of first auxiliary air engine is smaller than that of the corresponding moving carrier head; first auxiliary air engine comprises first intake pipe, first expansion chamber and first de Laval nozzle, as well as a firm tubular structure, through which first auxiliary air engine is fixed at the front of the moving carrier head; first intake pipe is located within the firm tubular structure, and supported by the firm tubular structure; the rear of first expansion chamber is integrally connected with first de Laval nozzle convergent section; whole first de Laval nozzle has de Laval nozzle-like structure from front to rear; first intake pipe, along with the firm tubular structure, extends forward from the moving carrier head, and forward passes through first auxiliary air engine nozzle, first de Laval nozzle divergent section, first de Laval nozzle throat, first de Laval nozzle convergent section and first expansion chamber in sequence along with the axial center of first auxiliary air engine to be fixedly connected with first expansion chamber head inner wall, on which first air injection vent and air injection adjuster equipped; the compressed air in first expansion chamber is accelerated under the pressure to pass through first de Laval nozzle convergent section, first de Laval nozzle throat, and finally the gap located between first de Laval nozzle divergent section and conical widened portion of firm tubular structure, ejecting backwards around the moving carrier head, along one conical side, the generatrix of the conical side is equivalent to the connection line from first de Laval nozzle throat to the periphery of the moving carrier head, to form a conical low-pressure area in front of the moving carrier head for reducing air resistance or seawater resistance when the moving carrier moves forward;

wherein, first auxiliary air engine is also used to apply certain thrust for forward movement of the moving carrier.

Preferably, there are several second auxiliary air engines are placed around the moving carrier with their nozzles toward the rear of the moving carrier to eject high-velocity airflow for applying thrust to the moving carrier forward; moreover, the high-velocity airflow ejected by the nozzles of second auxiliary air engines is parallel and close to the surface of the moving carrier, so that a low-pressure air layer is formed around the moving carrier, thus reducing sliding friction resistance between the moving carrier and its surroundings when it moves forward.

Preferably, the moving carrier is equipped with one or more air tanks, in each of air tanks there are several air storage pipes which have a long tubular structure with a cylindrical air storage pipe wall made of high-pressure resistant and lighter materials;

wherein, a plurality of air storage pipes are arranged in bundle and parallel with its whole cross section as a plum-like structure; each of the air storage pipes is equipped with an intake valve and an exhaust valve, which opening and closing are individually controlled by the controller;

wherein, around the air storage pipes backup electric heaters are arranged, to start when the compressed air jet engine overworks for some reason, and when the compressed air pressure in all of air storage pipes is lower than a set limit;

wherein, one ends of air storage pipes are communicated with an air reception multi-way pipe, converging into an air reception pipe; another ends of air storage pipes are communicated with an air delivery multi-way pipe, converging into an air delivery pipe; the air storage pipes are communicated through the air delivery pipe with the intake pipe.

In this invention, the air reception pipe is used for receiving compressed air pressurized and inflated from the large boiler-type pressure vessel.

Preferably, the large boiler-type pressure vessel for compressing and charging air to the air storage pipes in air tank includes a large-scale flowing water tank and a plurality of large-capacity tubular containers and manifolds placed in the water tank;

wherein, a plurality of large-capacity tubular containers are distributed into several groups of row tubes, and the manifolds are placed on both sides of each groups of row tubes; every large-capacity tubular container arranged in a form of row tubes has two ends equipped with an inlet and an outlet; the manifold communicated with the inlets of the large-capacity tubular containers in a group is intake manifold, and the manifold communicated with the outlets of the large-capacity tubular containers in a group is exhaust manifold; the inlet of the large-capacity tubular container is equipped with an inlet valve, and the outlet of the large-capacity tubular container is equipped with an outlet valve; the intake manifold is equipped with a manifold inlet and a manifold inlet valve, and the exhaust manifold is equipped with a manifold outlet and a manifold outlet valve.

In this invention, the design volume and pressure of the large-capacity tubular container are respectively greater and higher than those of the air storage pipes; some large-capacity tubular containers are serpentine pipes, in a tubular structure circuitously extending many times within the plane of row tubes;

wherein, the row tubes spread in one plane, as well as the intake manifold and exhaust manifold on the two sides of the row tubes, constitute a large-capacity tubular container plane; in one large-scale flowing water tank there are several large-capacity tubular container planes, the intake manifolds of these large-capacity tubular container planes are communicated through several intake manifold communication tubes and share one manifold inlet equipped with a corresponding manifold inlet valve, and the exhaust manifolds of these large-capacity tubular container planes are communicated through several exhaust manifold communication tubes and share one manifold outlet equipped with a corresponding manifold outlet valve;

wherein, the large-scale flowing water tank is equipped with a water inlet for the inflow of cooling water and a water outlet for the outflow of hot water, which is communicated with the underground buried insulating pipework in a central heating system.

In this invention, an air compressor discharge port of high/ultrahigh pressure air compressor is detachably connected to manifold inlet for pressurizing and inflating air into the large-capacity tubular container.

This invention provides an airplane which comprises the system of using compressed air as force source abovementioned, wherein first auxiliary air engine is placed in front of the airplane head, second auxiliary air engines are placed on the peripheral side of the airplane fuselage, and a plurality of third auxiliary air engine are placed symmetrically in front of the wings on both sides of the airplane; the nozzles of third auxiliary air engines eject high speed airflow back towards the wings, and the direction of the high-speed airflow is as same as the direction of airflow towards the wings during the airplane rolls to takeoff; third auxiliary air engines are used for increasing the lift force of the airplane wings to facilitate a short-range or vertical takeoff/landing, as well as for applying the thrust for the airplane moving forward corresponding to the reaction forces of the airflow ejected from the nozzles of third auxiliary air engines.

Preferably, fourth auxiliary air engine is placed below the airplane fuselage, for ejecting the airflow to the rear or front lower direction below the airplane, in order to apply the counteraction forces toward the front or rear up direction above the airplane; fifth auxiliary air engines are placed just beneath the airplane tail, or symmetrically on both sides of the tail, for ejecting high velocity airflow in the reverse direction of the airplane flight, in order to play a role in buffering and deceleration on the flight of the airplane.

In this invention, a method of operating the system of using compressed air as force source according to abovementioned comprises the following steps:

Step one: pressurizing and inflating air into a large boiler-type pressure vessel by high/ultra-high pressure air compressor.

During this step, manifold inlet valve, all of inlet valves and outlet valves of large tubular containers are open while manifold outlet valves closed.

In this process, motor utilizes night off-peak electricity or power not easy to be stored, such as wind power, solar energy and the like, to drive high/ultrahigh pressure air compressor for pressurizing and inflating air, through compressor discharge port, manifold inlet and its opened manifold inlet valve, all of large tubular container inlets and their opened inlet valves, and all of large tubular container outlets and their opened outlet valves into intake manifolds located in large-scale flowing water tank, all of large-capacity tubular containers and exhaust manifolds.

A controller controls the pressure and the quantity of the air filled from air compressor discharge port to adapt to the water flow rates of cooling water flowing from water inlet and of hot water flowing out of water outlet of large-scale flowing water tank, so that the heat, by-produced during production of compressed air in intake manifolds, all of large-capacity tubular containers and exhaust manifolds, is timely carried away by cooling water, which is heated to become hot water at an appropriate temperature in due course flowing from water outlet to underground buried insulating pipework for central heating, until a large amount of compressed air in intake manifolds, all of large-capacity tubular containers and exhaust manifolds, while still basically remaining the normal temperature, reaches the high pressure as designed to store for backup.

Then manifold inlet valves, all of inlet valves and outlet valves of all large-capacity tubular containers are closed, while manifold outlet valves remain closed.

Step two: inflating air from a large boiler-type pressure vessel into air tank; during this process, manifold inlet valves and inlet valves of all large-capacity tubular containers are closed, only single one of outlet valves of all large-capacity tubular containers is separately orderly opened but the rest outlet valves are closed, while manifold outlet valves are opened; manifold outlet is connected with air reception pipe shared by air storage pipes in air tank while only single one of intake valves of air storage pipes in air tank is open respectively and orderly, while other intake valves are closed.

The controller controls the compressed air orderly from the opened outlet valve of a large-capacity tubular container, through the opened manifold outlet valve, manifold outlet, air reception pipe shared by air storage pipes in air tank and an opened air storage pipe intake valve to fill that air storage pipe.

During the process of filling one by one of air storage pipes with compressed air from a large-capacity tubular container, in which the air pressure gradually drop down, so that, later when an air storage pipe is in turn to be filled, the air pressure within the large-capacity tubular container has fallen to be equal to the air pressure gradually increased in the air storage pipe, to make the large-capacity tubular container unable to continue any longer to output air into the air storage pipe in which air pressure is yet to rise to the designed condition, then controller controls the opening and closing of outlet valves of large-capacity tubular container and intake valves of air storage pipes to let the large-capacity tubular container under a reduced air pressure fill other air storage pipes which has not been inflated or have a relatively lower air pressure, and to let the air storage pipes, with its air pressure increased through inflation but yet to rise to the designed condition, have the large-capacity tubular container under initially or relatively higher air pressure to fill them.

During the process of inflating compressed air from large-capacity tubular container into air storage pipes, the air in the air storage pipes with increasing air pressure thus has a warming trend, whereas the compressed air input from the large-capacity tubular container into air storage pipes with relatively decreasing air pressure thus has a cooling trend; the controller controls the flow and velocity of compressed air input from the large-capacity tubular container into air storage pipes so that, during the process, the pressure in the air storage pipes is increased gradually to a designed condition simultaneously making the warming and cooling trends relatively balanced at a basically stable temperature.

Step three: inflating air from air tank into air engine.

During the operation of air engine, all of intake valves of all air storage pipes in air tank are closed, only one or several of exhaust valves of all air storage pipes in air tank are open respectively and orderly while rest exhaust valves are closed; the controller controls compressed air injection orderly from one or several opened exhaust valves of air storage pipes and air delivery pipe into the connected intake pipe, and through the air injection vent installed at the expansion chamber head and air injection adjuster into the expansion chamber.

The diameter of intake pipe is smaller than that of air storage pipe; as intake pipe electric heater and expansion chamber wall electric heater are working, compressed air entering the expansion chamber is moderately heated to maintain a relatively higher pressure, and under higher pressure it flows in turn into de Laval nozzle convergent section connected with the end of expansion chamber, then through de Laval nozzle throat and de Laval nozzle divergent section to eject out, thus being greatly accelerated to generate a huge thrust; such high-speed airflow ejected out also affects the changes of relevant local aerodynamics.

3, Beneficial Effects

This invention provides a system of using compressed air as force source, wherein the compressed air jet engines use high/ultrahigh pressure compressed air, supplied from the air tank as an airborne compressed air storage vessel, as a jet working medium to produce power, with no need to carry fuel and relevant combustion facilities for a traditional technology jet engine, so that the whole machinery is lightened in weight, simplified in structure, lower in manufacturing cost, and favorable for its research-development, production, control and application.

In this invention, the high/ultrahigh-pressure air compressor with a working pressure close to 100 MPa or ≥100 MPa charges air into the large-capacity tubular containers, which then supply the high/ultrahigh pressure compressed air for the air storage pipes in the air tank ready to use. The electric motor of the high/ultrahigh-pressure air compressor makes use of night off-peak electric energy or wind power that is not easy to store. A large amount of heat energy, equivalent to 90% of the consumed electric energy, accompanied in the production process of the high/ultrahigh-pressure air in the large boiler-type pressure vessel have heat exchange with the cooling water flowing into the large-scale flowing water tank to become hot water for central heating. Therefore, it is done to produce compressed air with higher pressure, economical use and low cost of electric energy, and at same time, with clean heat supply, energy-saving and emission-reducing.

In this invention, the pressure of ultra/high-pressure air in the air tank, air storage pipe, air delivery pipe, expansion chamber and de Laval nozzle of a compressed air jet engine can be close to 100 MPa or ≥100 MPa, much higher than that of the internal combustion gas in combustion chamber of a present technology rocket (1~20 MPa), and so provides the main air engine in this invention with a larger thrust, higher thrust-weight ratio and lower "mass ratio", favorable to promote the ratio of payload to takeoff mass.

In this invention, the high-speed airflow ejected from the compressed air jet engine nozzle, as its temperature is very significantly lower than that of the burning combustion gas from the traditional jet engine nozzle, does not cause the ablation damage to the moving carrier body surface, the surrounding facilities, the road surface or the deck, and so can be used to affect the local aerodynamic changes, with a plurality of auxiliary air engines arranged in front and the surrounding of the moving carrier such as an airplane, a rocket, a submarine, a train and the like, for reducing the air (or seawater) resistance and sliding friction of the moving carrier during traveling, favorable to the speed-rising and energy-saving; these auxiliary air engines can also be arranged in the front of the airplane wings, beneath the fuselage and tail of the airplane to improve the lift of the airplane wings, push up the airplane fuselage, buffer and decelerate the velocity of the airplane, so it is favorable to the airplane short-distance or vertical take-off/landing.

Figure 1:
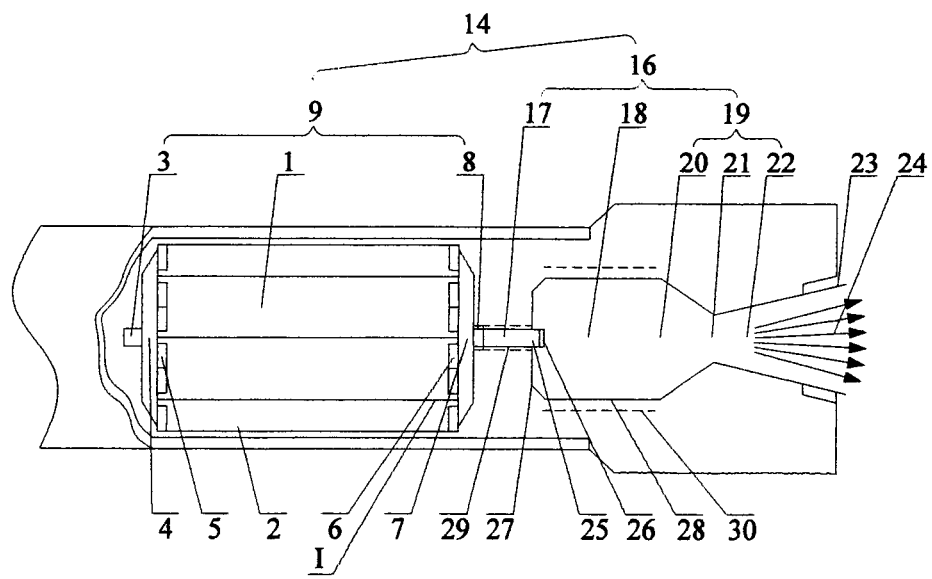
FIG. 1 is a structure schematic diagram of the compressed air jet engine in Embodiment of this invention.

Wherein, 1: air storage pipes; 2: air storage pipe walls; 3: air reception pipe; 4: air reception multi-way pipes; 5: intake valve; 6: exhaust valve; 7: air delivery multi-way pipe; 8: air delivery pipe; 9: air tank; 10: air storage pipe A; 11: air storage pipe B; 12: air storage pipe C; 13: air storage pipe D; 13a: air storage pipe E; 14: compressed air jet engines; 15: backup electric heater; 16: air engines; 17: intake pipe; 17a: first intake pipe; 18: expansion chamber; 18a: first expansion chamber; 19: de Laval nozzle; 19a: first de Laval nozzle; 20: de Laval nozzle convergent section; 20a: first de Laval nozzle convergent section; 21: de Laval nozzle throat; 21a: first de Laval nozzle throat; 22: de Laval nozzle divergent section; 22a: first de Laval nozzle divergent section; 23: de Laval nozzle orifice; 24: high-speed airflow; 25: air injection vent; 26: air injection adjuster; 27: expansion chamber head; 28: expansion chamber wall; 29: intake pipe electric heater; 30: expansion chamber wall electric heater; 31: first auxiliary air engine; 32: moving carrier head; 32a: connection line; 33: firm tubular structure; 33a: conical widened portion of firm tubular structure; 34: end of firm tubular structure/intake pipe; 35: air injection vent/air injection adjuster; 37: first expansion chamber head inner wall; 39: first auxiliary air engine nozzle; 40: conical low-pressure area; 41: main air engine; 42: second auxiliary air engine; 43: raindrop shape; 44: third auxiliary air engine; 45: wing upper surfaces; 46: fourth auxiliary air engine; 47: fifth auxiliary air engine; 48: compressed air production/supply device; 49: large boiler-type pressure vessel; 50: high/ultrahigh pressure air compressor; 51: motor; 52: air compressor discharge port; 53: manifolds; 54: large-scale flowing water tank; 55: water inlet; 56: water outlet; 57: underground buried insulating pipework; 58: cooling water; 59: hot water; 60: large-capacity tubular containers; 61: large-capacity tubular containers wall; 62: large-capacity tubular container A; 63: large-capacity tubular container B; 64: large-capacity tubular container C; 65: intake manifold; 66: manifold inlet; 67: manifold inlet valve; 68: exhaust manifold; 69: manifold outlet; 70: manifold outlet valve; 71: intake manifold communication tube; 72: exhaust manifold communication tube; 73: large-capacity tubular container plane; 74: row tubes; 75: serpentine pipes; 76: inlet; 77: outlet; 78: inlet valve; 79: outlet valve.

SPECIFIC EMBODIMENTS

Hereinafter, this invention will be described further in detailed embodiments referring to the drawings. The following embodiments illustrate this invention but are not intended to limit the scope of this invention.

In the description of this invention, it is necessary to illustrate, unless expressive rules and limits, the term "connection" should have a general understanding, for example, it can be a fixed connection, also a detachable connection, or an integrated connection; it can be connected directly, also indirectly through intermediaries; it can be an electric connection, or a communication connection. For ordinary technical personnel in the field, the specific meaning of the term in this invention can be understood according to the particular cases.

As shown in FIGS. 1-7, this embodiment describes a system using compressed air as force source, characterized in that, the system comprises compressed air jet engines 14 using high/ultrahigh pressure compressed air (hereinafter referred to as compressed air) as a jet working medium, a device for economically producing, storing and supplying a large amount of compressed air (referred to as a compressed air production/supply device 48), and a controller.

The compressed air jet engines 14 is arranged on a moving carrier of aviation, aerospace, navigation and ground vehicles such as an airplane, a rocket, a submarine, a train or the like, and includes an air tank 9 and an air engines 16; the air tank 9 is a compressed air storage container, and includes a plurality of air storage pipes 1 for storing and supplying compressed air needed for the air engines 16; the air engines 16 includes a main air engine 41 and a plurality of auxiliary air engines; the main air engine 41 can be arranged in a position where a traditional technology jet engine is installed on an airplane, e.g., at the airplane-tail, under wings, etc., or arranged at the rear end of a moving carrier such as a rocket, a submarine, a train or the like, to use the compressed air input from the air tank 9 as the jet working medium for applying a forward moving thrust to the moving carrier of aviation, spaceflight, navigation and ground vehicles; the plurality of auxiliary air engines include a first auxiliary air engine 31, second auxiliary air engine 42, third auxiliary air engine 44, fourth auxiliary air engine 46 and fifth auxiliary air engine 47 arranged at various positions on the moving carrier of the aviation, aerospace, navigation and ground vehicles such as an airplane, a rocket, a submarine, a train or the like, and are used for assisting the moving carrier such as an airplane or the like in moving by using the compressed air input from the air tank 9 as the jet working medium.

The compressed air production/supply device 48 includes a high/ultrahigh pressure air compressor 50 and a large boiler-type pressure vessel 49; the working pressure of the compressor 50 is ≥100 MPa, for pressurizing and inflating air to the large boiler-type pressure vessel 49 under the control of the controller; the compressed air produced and stored in the large boiler-type pressure vessel 49 can be pressurized and inflated into the air storage pipes 1 of the air tank 9 under the control of the controller and used by the main and auxiliary air engines.

The controller is an automatic control system including a computer, sensors, various valves and adjusters thereof, connected with each part of the system using compressed air as force source, and used for controlling coordinated and ordered operations of the system using compressed air as force source, mainly to control the opening and closing of the main air engine 41, the first auxiliary air engine 31, the second auxiliary air engine 42, the third auxiliary air engine 44, the fourth auxiliary air engine 46 and the fifth auxiliary air engine 47 for pushing the moving carrier toward the target direction.

Figure 2:
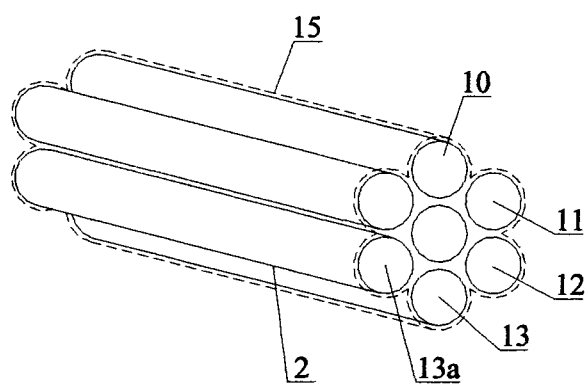
FIG. 2 is a three-dimensional bevel view of I-section of FIG. 1.
Figure 5:
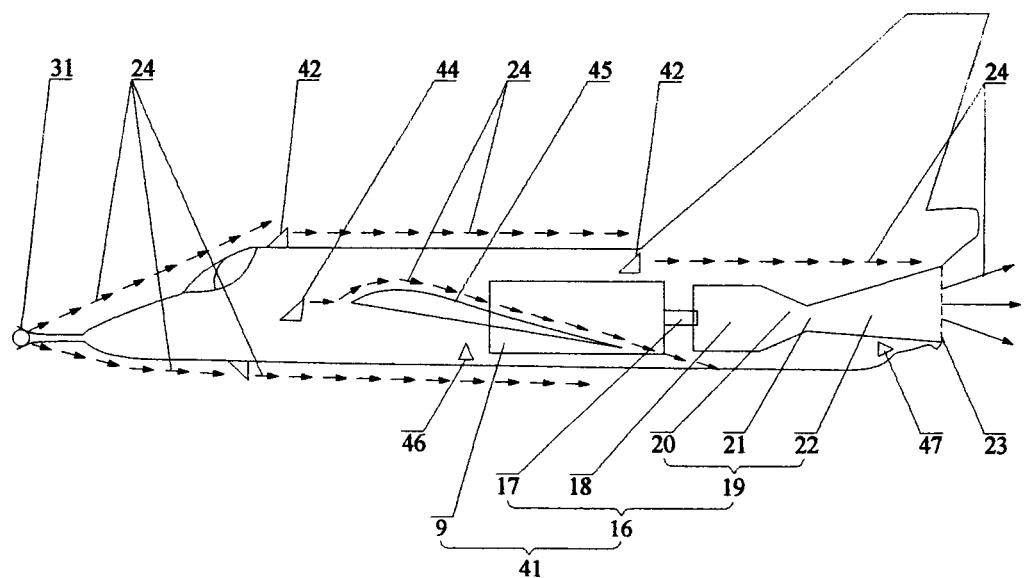
FIG. 5 is a side view of the compressed air jet engines arranged on an airplane in Embodiment of this invention.

As shown in FIG. 1, FIG. 2 and FIG. 5, the air engines 16, the main air engine 41 or each of auxiliary air engines, includes an intake pipe 17, a compressed air expansion chamber hereinafter referred to as an expansion chamber 18 and a de Laval nozzle 19 made of a high pressure-resistant and lighter material.

The intake pipe 17 is connected between the air storage pipe 1 and the expansion chamber 18. The length and direction of the intake pipe 17 are related to the positions of the air storage pipe 1 and the expansion chamber 18 at two ends of the intake pipe 17, and related to the position of each of the main and auxiliary air engines; an intake pipe electric heater 29 is arranged on the circumference of the intake pipe 17, and the compressed air in the air storage pipe 1 is injected into the expansion chamber 18 via an air injection vent 25 of the intake pipe 17.

A compressed air injection adjuster 26 is arranged on the inner surface of the expansion chamber wall 28 of the expansion chamber head 27, the air injection vent 25 is a basic element forming the air injection adjuster 26, which modulates the compressed air, with increasing pressure due to appropriate heating of the intake pipe electric heater 29 in the intake pipe 17, to be injected into the expansion chamber 18 at a certain flow rate; the expansion chamber 18 is cylindrical, spherical or annular in shape and has the volume to make sure that the compressed air injected into it from the intake pipe 17 is maintained at a design pressure. An expansion chamber wall electric heater 30 for appropriately heating the compressed air entering the expansion chamber 18 is arranged on its circumference, so as to maintain the pressure of the compressed air and do expansion work in the expansion chamber 18; the rear of the expansion chamber 18 is integrally connected with de Laval nozzle convergent section 20.

The cross-sectional area of the de Laval nozzle 19 is first converged and then diverged. The de Laval nozzle 19 (also known as convergent-divergent nozzle) is composed of de Laval nozzle convergent section 20, de Laval nozzle throat 21 and de Laval nozzle divergent section 22, and can be used as a "flow rate enlargement device"; under air pressure in the expansion chamber 18 compressed airflow firstly enters de Laval nozzle convergent section 20, following the principle that "when fluid moves in a pipe, the flow rate is higher where the cross-sectional area of the pipe is smaller, and lower where the cross-sectional area of the pipe is larger", herein the airflow is continuously accelerated, and when it flows into de Laval nozzle throat 21 the flow rate may exceed the sonic velocity, whereas the fluid during moving at the transonic velocity no longer follows the above-mentioned principle, on the contrary, the larger the cross-sectional area of the pipe is, the higher the flow rate is, and the airflow through de Laval nozzle divergent section 22 is further accelerated to the supersonic velocity and ejected from de Laval nozzle orifice 23 at an extremely high flow rate.

In this embodiment, the nozzle of the air engines 16 ejects high-speed air flow 24 to produce a huge thrust, so that the main air engine 41 thrusts the moving carrier of aviation, aerospace, navigation and ground vehicles such as the airplane, rocket, submarine, train or the like moving toward; meanwhile, the nozzle of the air engines 16 ejects the high-speed airflow 24 to cause regional aerodynamic change, and the temperature of the airflow is significantly lower than that of scorching gas ejected by the traditional technology jet engine so that the airflow does not ablate to damage the surface of the moving carrier (and surrounding facilities, road surface or decks), the first auxiliary air engine 31 can be arranged in the front of moving carrier head 32 of the aviation, aerospace, navigation and ground vehicles such as the airplane, rocket, submarine, train or the like, and used for reducing air resistance (or seawater resistance) when the moving carrier advances, the second auxiliary air engines 42 are arranged on the body circumference of the submarine (not shown in the figures) and used for reducing the sliding friction between the submarine body and seawater when it runs, and the third auxiliary air engine 44, the fourth auxiliary air engine 46 and the fifth auxiliary air engine 47 can also be respectively arranged in the front of the airplane wings, at the lower part of its body and at its tail and used for improving the lift force of the airplane wings, pushing up the airplane body and buffering and decelerating the airplane.

Figure 3:
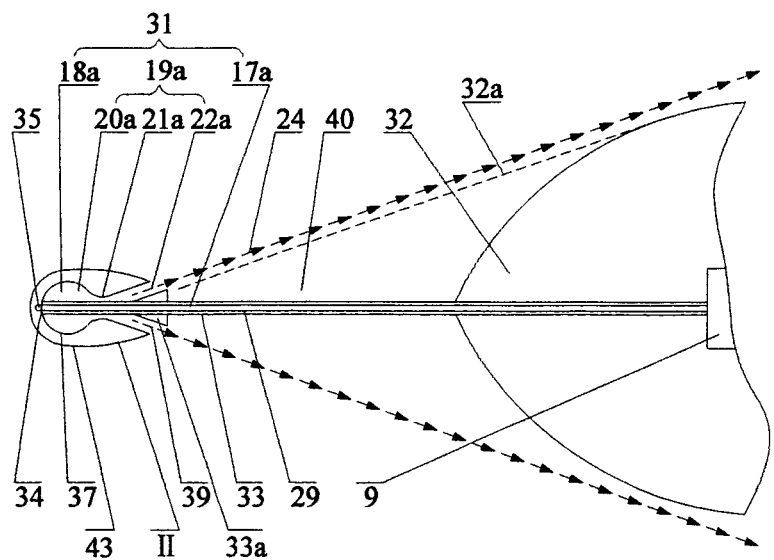
FIG. 3 is a side view of the first auxiliary air engine in Embodiment of this invention.
Figure 4:
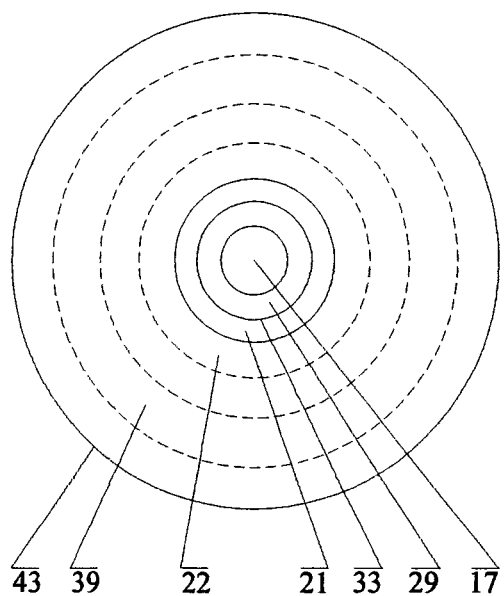
FIG. 4 is an enlarged front view of II-section of FIG. 3.

As shown in FIG. 3, FIG. 4 and FIG. 5, the first auxiliary air engine 31 is arranged in the front of the moving carrier head 32 of the moving carrier; the first auxiliary air engine 31 is in a raindrop shape 43, and its cross section area is smaller than that of the corresponding moving carrier head 32; the first auxiliary air engine 31 includes a first intake pipe 17a, a first expansion chamber 18a and a first de Laval nozzle 19a, and further includes a firm tubular structure 33 through which the first auxiliary air engine 31 is fixed in the front of the moving carrier head 32; the first intake pipe 17a is located in the firm tubular structure 33, and supported by the firm tubular structure 33; the rear of the first expansion chamber 18a is integrally connected with the first de Laval nozzle convergent section 20a; like a de Laval nozzle, the whole first de Laval nozzle 19a has a converging-diverging structure from front to rear; the first intake pipe 17a extends forward from the moving carrier head 32 together with the firm tubular structure 33 and forward passes through first auxiliary air engine vent 39, a first de Laval nozzle divergent section 22a, a first de Laval nozzle throat 21a, the first de Laval nozzle convergent section 20a and the first expansion chamber 18a in sequence along the axial center of the first auxiliary air engine 31, and then the end of firm tubular structure/intake pipe 34 are fixedly connected with first expansion chamber head inner wall 37, on which first air injection vent/air injection adjuster 35 is arranged; the compressed air in first expansion chamber 18a is accelerated under the pressure to pass through first de Laval nozzle convergent section 20a and first de Laval nozzle throat 21a, finally passes through the clearance between the first de Laval nozzle divergent section 22a and conical widened portion of firm tubular structure 33a and is ejected backwards around the moving carrier head 32 along one conical side, the generatrix of the conical side is equivalent to a connection line 32a from the first de Laval nozzle throat 21a to the periphery of the moving carrier head 32, to form a conical low-pressure area 40 in front of the moving carrier head 32 for reducing air (or seawater) resistance when the moving carrier moves forward.

In this embodiment, the first auxiliary air engine 31 is mainly used for reducing air (or seawater) resistance when the moving carrier moves forward. The thrust for forward movement of the moving carrier mainly comes from the main air engine 41, and the magnitude of the force for thrusting the first auxiliary air engine 31 forward in the resultant of the reactive force of the air ejected by the nozzle of the first auxiliary air engine 31, namely the magnitude of the "pull" for forward movement of the moving carrier, is controlled by the controller.

The second auxiliary air engines 42 are plural and are arranged on the circumference of the moving carrier, nozzles of the plurality of second auxiliary air engine 42 eject high-speed air flow towards the back of the moving carrier to apply a thrust to forward movement of the moving carrier, and the high-speed airflow ejected by the nozzles of the second auxiliary air engines 42 is parallel and close to the surface of the moving carrier, so that a low-pressure air layer is formed around the moving carrier to reduce sliding friction resistance between the moving carrier and its surroundings when it moves forward.

The second auxiliary air engines 42 are arranged on the circumference of the submarine body (not shown in the figures) and can be plural, their nozzles eject backward high-speed airflow close and parallel to and covering the submarine body surface. The velocity of the high-speed airflow is high, and so its pressure on the submarine body surface (the normal force perpendicular to the surface) is low, while the high-speed airflow can blow away and sweep off seawater from the submarine body surface to form a low-pressure air layer around the submarine body. Consequently, the sliding friction resistance with the surrounding seawater is reduced when the submarine moves forward. Besides, the high-speed airflow ejected backward by these second auxiliary air engines 42 also apply a certain thrust to the submarine for its travel.

As shown in FIG. 1 and FIG. 5, the third auxiliary air engines 44 are arranged in the front of the leading edges of the airplane wings and distributed symmetrically, one or more third auxiliary air engines 44 can be arranged on each side, their nozzles eject backward high-speed air flow 24 blowing on the wings, the included angle between the direction of the high-speed airflow ejected by the nozzles and the wing chords (connecting lines between leading edges and back edges of wings) are equivalent to the angle of attack of the wings during takeoff taxiing of the airplane. That is, the included angles between the direction of airflow and the wing chords during takeoff taxiing of the airplane, in other words, the direction of the high-speed airflow ejected by the nozzles of the third auxiliary air engine 44 is consistent with the airflow direction relative to the wings during takeoff taxiing of the airplane. In this case, the high-speed airflow ejected by the nozzles of the third auxiliary air engine 44 increases the pressure difference between the upper and lower surfaces of the wings (the airflow of the wing upper surfaces 45 is high in flow rate but low in pressure), also impacts the lower surfaces of the wings with certain angles of attack, and flows close to the protruding wing upper surfaces 45 till the airflow leaving the wings move downward at a high speed, and therefore has the effect of improving the lift force of the wings according to the Bernoulli's principle, Newton's third law and Coanda effect;

The lift force formula of the airplane generally can be expressed as:

$$Y = \tfrac{1}{2} C_y \rho v^2 S$$

where Y is the lift force, $C_y$ a lift coefficient, $\rho$ the air density, v the velocity of airflow relative to wings, and S the wing area.

Herein, the present invention independently develops a simple mathematical theory applied to short-distance or vertical take-off and landing of an airplane, wherein the velocity v of the airflow relative to wings is referred to as "air velocity", the velocity of the airplane relative to the take-off (or landing) runway is referred to as "airplane velocity" and expressed as $V_a$, and then a new term "The ratio of air velocity to airplane velocity" is proposed and expressed as B:

$$B = \text{air velocity/airplane velocity} = v/V_a$$

Generally, v≈$V_a$ in approximate calculation, and when v reaches minimum safe liftoff velocity (the airplane begins liftoff) in take-off accelerated taxiing of the airplane, $$B=v/V_a\approx 1.$$

As to the airplane with the third auxiliary air engine 44, the velocity of the high-speed airflow ejected backward to the wings by the nozzles of the third auxiliary air engine 44 is referred to as air ejection velocity set to be $V_e$, so that, for the airplane with the third auxiliary air engine 44, the air velocity v is equivalent to the sum of the airplane velocity $V_a$ and the air ejection velocity $V_e$, $$v=V_a+V_e,$$

The air ejection velocity $V_e$ of the high-speed airflow 24 ejected from the de Laval nozzles 19 (see FIG. 1) of the third auxiliary air engine 44 (FIG. 5) is very high, and can reach/exceed the sonic velocity (≥340.29 m/s, equivalent to ≥1225 km/h) as described above and significantly exceed the take-off velocity of any airplane (generally, the take-off velocity of airplanes is 200-350 km/h); when the airplane just starts to run and even yet to taxi, the air velocity v (i.e., the velocity of airflow relative to wings) constituted even if only by the air ejection velocity $V_e$ of the high-speed airflow 24 ejected backward to the wings from the nozzles of the third auxiliary air engine 44 but reaches and exceeds the above-mentioned minimum safe liftoff velocity of the airplane (the airplane begins liftoff), at the moment "the ratio of air velocity to airplane velocity" B (B=v/$V_a$) is very large, the airplane velocity $V_a$ is very small, that is, the airplane has lifted off after running within a very short distance during take-off taxiing, so that short-distance or vertical take-off is realized.

When short-distance or vertical landing is needed, the airplane approaches, glides, flatten-out and throttle-back to idle . . . before the airplane velocity ($V_a$) is continuously reduced until the wing lift force is not sufficient to balance the weight of the airplane, the third auxiliary air engine 44 work to eject high-speed airflow to the wings to maintain the wing lift force (maintain the air velocity v with the air injection velocity $V_e$), thereby increasing the "The ratio of air velocity to airplane velocity", the airplane can slowly decelerate above a predetermined landing runway or nearly suspend in the air, then the controller controls the nozzles of the third auxiliary air engine 44 to eject air gradually slow, the air ejection velocity $V_e$ gradually declines i.e. the air velocity v gradually declines, and the air velocity v gradually declines till the wing lift force is not sufficient to balance the weight of the airplane and the airplane falling touchdown, the third auxiliary air engine 44 stops working, the airplane lands at the residual velocity taxiing for a short distance to stop, and the short-distance or vertical landing is accomplished.

In this embodiment, the third auxiliary air engines 44 start under the control of the controller in short-distance/vertical take-off and landing of the airplane or other special circumstances, and their output power is controlled within a certain range so that they often apply very little thrust for forward flight to the airplane; and if necessary, the controller can control the thrust for forward flight from the third auxiliary air engine 44 to the airplane to be appropriately increased.

As shown in FIG. 1 and FIG. 5, the fourth auxiliary air engine 46 is placed below the airplane fuselage, for ejecting the airflow to the rear or front lower direction below the airplane without ablating road surface or decks, in order to apply the counteraction forces toward the front or rear up direction above the airplane; fifth auxiliary air engines 47 are placed just beneath the airplane tail, or symmetrically on both sides of the tail, for ejecting high velocity airflow in the reverse direction of the airplane flight, in order to play a role in buffering and deceleration on the flight of the airplane.

If necessary in the short-distance/vertical take-off process of the airplane, the nozzles of the fourth auxiliary air engine 46 eject airflow to the rear lower direction below the airplane body to give certain reactive force toward the front up direction above the airplane, thus assisting the third auxiliary air engine 44 in working to further shorten the take-off taxiing distance of the airplane.

If necessary in the short-distance/vertical landing process of the airplane, the nozzles of the fifth auxiliary air engine 47 eject airflow in a direction opposite to the flight direction to decelerate the airplane, and the nozzles of the fourth auxiliary air engine 46 eject the airflow to the front lower direction below the airplane body to give certain reactive force toward the rear up direction above the airplane, thus coordinating the third auxiliary air engine 44 in working to further assist the airplane in slow flight or suspension above the predetermined landing runway and shorten the landing taxiing distance of the airplane.

In this embodiment, the fourth auxiliary air engine 46 and the fifth auxiliary air engine 47 start under the control of the controller in short-distance or vertical take-off/landing of the airplane or other special circumstances, and their output power is limited to coordinate and assist the third auxiliary air engine 44 in accomplishing the short-distance or vertical take-off/landing of the airplane.

As shown in FIGS. 1, 2, 3 and 5, one or more air tanks 9 matched with the main and auxiliary air engines can be arranged on the moving carrier of aviation, aerospace, navigation and ground vehicles such as the airplane, rocket, submarine, train or the like; in each air tank 9 there are several air storage pipes 1 which have a long pipe structure with a cylindrical air storage pipe walls 2 made of high-pressure resistant and light materials, and their pipe diameters are smaller than the inside diameters of compressed air storage tanks with the same capacity and pressure in the traditional technology, so the air storage pipes 1 can store compressed air with higher pressure under the same material conditions.

The plurality of air storage pipes 1 can be arranged in bundle front and back longitudinally in parallel with its whole cross section as a plum-like structure, and referred to as plum flower pipes, or more exactly, referred to as multi-hole plum flower pipes, e.g., seven-hole plum flower pipes; each of air storage pipes 1 is provided with an intake valve 5 and an exhaust valve 6 and thus forms an air storage unit which can be individually opened and closed; the plurality of air storage pipes 1 are equivalent to a plurality of air storage units and can be respectively referred to in sequence as an air storage pipe A 10, an air storage pipe B 11, an air storage pipe C 12, an air storage pipe D 13, an air storage pipe E 13a and the like, and their diameters and lengths are related to the design pressure and capacity of air tanks 9.

A backup electric heater 15 is arranged on the circumference of the air storage pipes 1, and generally not to turn on but appropriately to start under a certain emergency situation when the compressed air jet engines 14 overworks for some reason and the pressure of compressed air in all the air storage pipes 1 is lower than a set limit, to heat the air storage pipes 1. The compressed air in the pipes is heated while its temperature and pressure rise. The intake pipe electric heaters 29 and the expansion chamber wall electric heaters 30 also emergently increase the heating temperature when they are used to maintain the compressed air output from the air storage pipes 1 and ejected into the expansion chambers 18 via the intake pipes 17 at certain temperature and pressure, so that the power of the compressed air jet engines 14 is maintained within a period of time.

The air storage pipes 1 can also be bent and coiled together or naturally stretch according to the space and the trend of the framework of the moving carrier where the air storage pipes 1 situated, and if possible, the air storage pipes 1 are arranged at the positions close to the matched air engines 16, e.g., the air storage pipes 1 matched with third auxiliary air engines 44 may be arranged in the spaces within the airplane wings.

The plurality of air storage pipes 1 share one air reception pipe 3 in such a way that the front of the intake valve 5 for each of the air storage pipes 1 is communicated with an air reception multi-way pipe 4, which are combined into one air reception pipe 3, e.g., the seven intake valves 5 of the seven-hole plum flower pipe are communicated with seven pipes in one eight-way pipe, while the remaining pipe of the eight-way pipe is the air reception pipe 3 shared by the seven-hole plum flower pipe. Similarly, the plurality of air storage pipes 1 share one air delivery pipe 8, as their respective exhaust valves 6 are respectively communicated with an air delivery multi-way pipe 7, which are combined into one air delivery pipe 8, e.g., the seven exhaust valves 6 of the seven-hole plum flower pipe are communicated with seven pipes in another eight-way pipe, while the remaining pipe of the eight-way pipe is the air delivery pipe 8 shared by the seven-hole plum flower pipe.

Wherein, one air tank 9 can be matched with one air engines 16, i.e., the main air engine 41 or one of auxiliary air engines, to supply compressed air, and the air delivery pipe 8 shared by the air storage pipes 1 in the air tank 9 is directly communicated with the intake pipe 17 of the air engines 16; one air tank 9 can also be matched with a plurality of air engines 16, i.e., the main air engine 41 and/or the auxiliary air engines, to supply compressed air, the air delivery pipe 8 shared by the air storage pipes 1 in the air tank 9 can be bifurcated into multiple pipes, which are respectively communicated with the intake pipes 17 of the plurality of matched air engines 16.

The air reception pipe 3 shared by the plurality of air storage pipes 1 in the air tank 9 is used for receiving compressed air pressurized and inflated from the large boiler-type pressure vessel 49.

Figure 6:
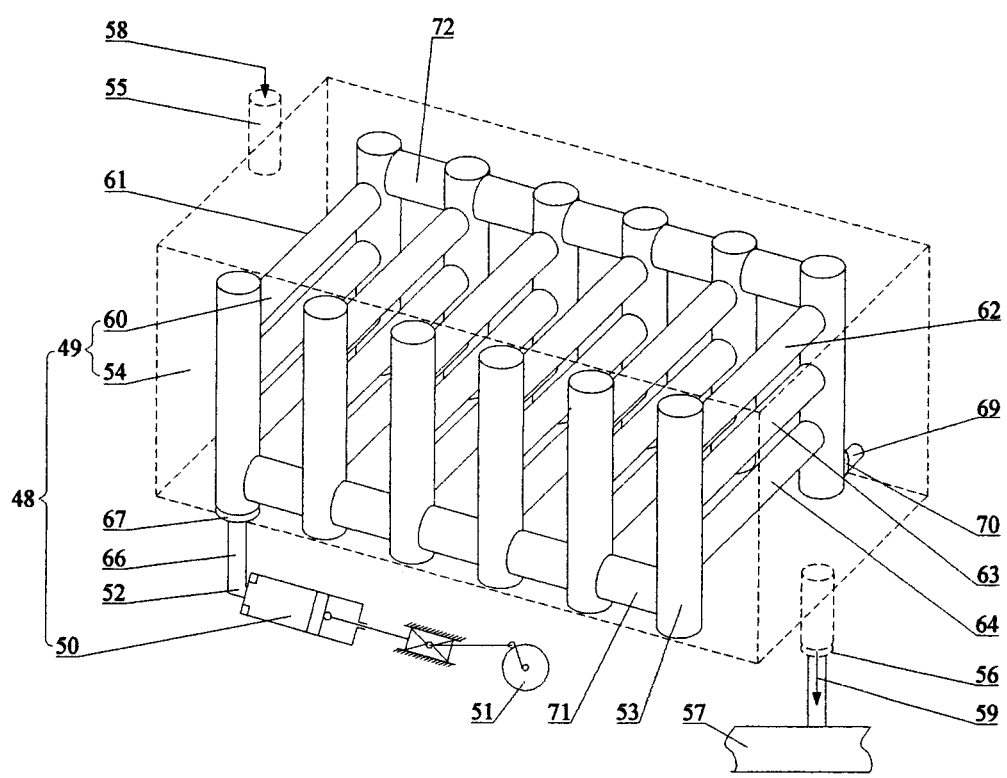
FIG. 6 is a structure schematic diagram of the compressed air production/supply device in Embodiment of this invention.
Figure 7:
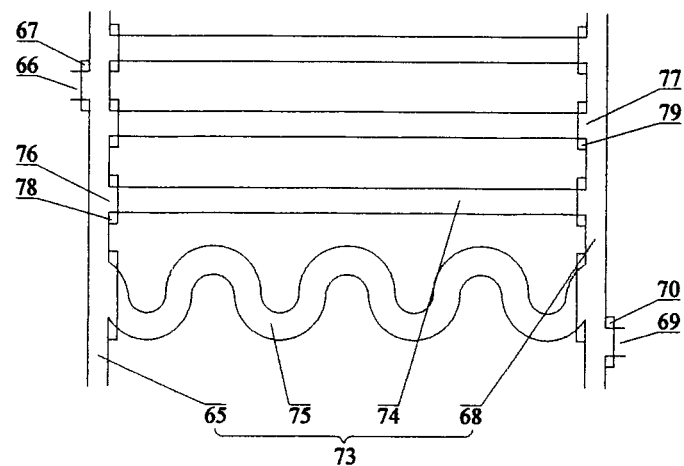
FIG. 7 is a front view of the large-capacity tubular container plane in Embodiment of this invention.

As shown in FIGS. 6 and 7, the large boiler-type pressure vessel 49 for compressing and charging air to the air storage pipes 1 in the air tank 9 includes a large-scale flowing water tank 54 and a plurality of large-capacity tubular containers 60 and manifolds 53 placed in the water tank; each of large-capacity tubular vessels 60 is a round pipe in shape, with large-capacity tubular containers wall 61 made of a high-pressure resistant and light materials, and diameter of the large-capacity tubular containers 60 is smaller than the inside diameters of compressed air storage tanks with the same capacity and pressure in the traditional technology, and it can tolerate and accommodate the compressed air with relatively higher pressure under the same material conditions.

The plurality of large-capacity tubular containers 60 in the large-scale flowing water tank 54 are distributed into several groups of row tubes 74, and the manifolds 53 are placed on both sides of each groups of row tubes 74; each of large-capacity tubular container 60 arranged in a form of row tubes 74 has two ends equipped with an inlet 76 and an outlet 77; the manifold 53 communicated with the inlets 76 of the large-capacity tubular containers 60 in a group is intake manifold 65, and the manifold 53 communicated with the outlets 77 of the large-capacity tubular containers 60 in a group is exhaust manifold 68; the inlet 76 of the large-capacity tubular container 60 is equipped with an inlet valve 78, and the outlet 77 of the large-capacity tubular container 60 is equipped with an outlet valve 79; the intake manifold 65 is equipped with a manifold inlet 66 and a manifold inlet valve 67, and the exhaust manifold 68 is equipped with a manifold outlet 69 and a manifold outlet valve 70.

The design volume and pressure of the large-capacity tubular container 60 are respectively larger and higher than the design volume and pressure of the air storage pipe 1; when the capacity of one row tube 74 is not sufficient to meet the design requirement, because it must guarantee that the pipe wall can bear high pressure without diverging the pipe diameter to expand the capacity, while the pipe length can be extended to meet the design requirement for expanding the capacity, then a serpentine pipe 75, i.e., a pipe circuitously extending many times in the spreading plane of the row tube 74, can replace the row tube 74 arranged between the intake manifold 65 and the exhaust manifold 68, and the serpentine pipe 75 is also connected with the intake manifold 65 and the exhaust manifold 68 via its inlet, inlet valve, outlet and outlet valve at its two ends, respectively.

The row tubes 74 and the serpentine pipes 75 spread in one plane, as well as the intake manifolds 65 and the exhaust manifolds 68 on two sides of the row tubes 74 and the serpentine pipes 75, constitute a large-capacity tubular container plane 73, which can be provided in one large-scale flowing water tank 54, wherein the intake manifolds 65 of these large-capacity tubular container planes 73 are communicated with each other via several intake manifold communication tubes 71, and share one manifold inlet 66 equipped with a corresponding manifold inlet valve 67; the exhaust manifolds 68 of these large-capacity tubular container planes 73 are communicated with each other via several exhaust manifold communication tubes 72, and share one manifold outlet 69 equipped with a corresponding manifold outlet valve 70.

Wherein, each row tube 74 or serpentine pipe 75 is equivalent to a large-capacity tubular container 60, namely a relatively independent compressed air production and storage unit; in the presence of multiple row tubes 74 and/or serpentine pipes 75, equivalent to multiple large-capacity tubular containers 60, they can be respectively referred to in sequence as a large-capacity tubular container A 62, a large-capacity tubular container B 63, a large-capacity tubular container C 64, etc., and the multiple large-capacity tubular containers 60 can also be arranged in other forms in the large-scale flowing water tank 54, e.g., they can be communicated and arranged between the spiral inlet manifolds and outlet manifolds in a cylindrical water tank.

The large-scale flowing water tank 54 is provided with a water inlet 55 for the inflow of cooling water 58 and a water outlet 56 for the outflow of hot water 59, which is communicated with underground buried insulating pipework 57 in a central heating system.

An air compressor discharge port 52 of the high/ultra-high pressure air compressor 50 can be detachably connected with the manifold inlet 66, a motor 51 of the high/ultrahigh pressure air compressor 50 works by means of electric energy including night off-peak electricity and wind power unlikely to be stored, and air is compressed and charged to each of large-capacity tubular containers 60 via the manifold inlet 66; heat exchange occurs between mass heat accompanied in the production process of a large amount of compressed air in the large-capacity tubular containers 60 and the cooling water 58 flowing in the large-scale flowing water tank 54, while the cooling water 58 is heated into hot water 59, which then flows out to collect in the underground buried insulating pipework 57 for central heating. The large amount of compressed air produced in the large-capacity tubular containers 60 can be stored therein, and the manifold outlet 69 can be detachably connected with the air reception pipe 3 of the air storage pipes 1 in the air tank 9 to compress and charge the compressed air from the large-capacity tubular containers 60 to the air storage pipes 1 in the air tank 9 when necessary.

The large boiler-type pressure vessel 49 can be arranged on or under the ground, in a large ship, in a vehicle such as a truck or train, and in a large transport airplane, wherein before the large boiler-type pressure vessels 49 arranged in the vehicle or the large transport airplane is hoisted or started, water stored in the large-scale flowing water tank 54 can be emptied, while the shell of the large-scale flowing water tank 54 can be removed, instead, a compact and light protective housing covers the large-capacity tubular containers 60, referred to as a compressed air container (not shown in the figures), thereby facilitating transportation, and charging compressed air to the air storage pipes 1 of the air tank 9 of the compressed air jet engines 14 arranged in the moving carrier such as the airplane, rocket, train, submarine or the like.

Wherein, the compressed air container is arranged in the large transport airplane as an aerial compressed air supply airplane, and can charge the compressed air to other airplane equipped with the compressed air jet engines 14 serving as an aerial compressed air receive airplane in the air; the manifold outlet 69 in the compressed air container borne by the aerial compressed air supply airplane extends out to the back of the airplane in a tubular shape and the tail end is of an umbrella-shaped taper sleeve, a telescopic air reception exploring pipe (not shown in the figures) is installed on the head of the aerial compressed air receive airplane and connected with the air reception pipe 3 of the air storage pipes 1 in the air tank 9, then after the aerial compressed air receive airplane and the aerial compressed air supply airplane "rendezvous", the telescopic air reception exploring pipe is connected and automatically locked with the umbrella-shaped taper sleeve are connected and automatically locked with each other, the air passage is automatically formed, "docking" is thus accomplished, the aerial compressed air supply airplane begins "supply air" to the aerial compressed air receive airplane in the air, and then two airplanes are "disconnected".

As shown in FIG. 3 and FIG. 5, the compressed air jet engines 14 can be arranged in the moving carrier of aviation, aerospace, navigation and ground vehicles such as the airplane, rocket, submarine, train or the like.

Wherein, in the airplane, the main air engine 41, the first auxiliary air engine 31, the second auxiliary air engine 42, the third auxiliary air engine 44, the fourth auxiliary air engine 46 and the fifth auxiliary air engine 47 can be selectively used or combined with the traditional technology engines: (1) the first auxiliary air engine 31 and the second auxiliary air engine 42 are used for reducing the air resistance of the airplane flying in the air and the sliding friction between the airplane and air, and thus are favorable for acceleration and energy conservation of the airplane; (2) the third auxiliary air engine 44 and the fourth auxiliary air engine 46 can be used for short-distance/vertical take-off of the airplane; the third auxiliary air engine 44, the fourth auxiliary air engine 46 and the fifth auxiliary air engine 47 can be used for short-distance/vertical landing of the airplane; the third auxiliary air engine 44, the fourth auxiliary air engine 46 and the fifth auxiliary air engine 47 are arranged at the functional positions, e.g., in the front of the airplane wings, below the airplane fuselage, at the tail of the airplane, etc. fixedly, or movably i.e. these engines at ordinary times and during flight are collected inside the wings and/or the body of the airplane to reduce exposed movable components, only during short-distance/vertical take-off and landing of the airplane they stretch out to the above functional positions and are started; (3) compressed air supplying in the air can be carried out if necessary; (4) the backup electric heater 15 can be started when the pressure of the compressed air in the air storage pipes 1 is relatively low due to overworking for some reasons, to maintain the power of the compressed air jet engines 14 for a period of time; (5) if necessary, e.g., when the main air engine 41 has failure, the power of the third auxiliary air engine 44 can be increased to maintain the flight for a period of time; (6) in emergency circumstances, the third auxiliary air engine 44, the fourth auxiliary air engine 46 and the fifth auxiliary air engine 47 are matched with each other and collaboratively work, so that the airplane safely performs short-distance/vertical landing on an open area; (7) moreover, the main air engine 41, the first auxiliary air engine 31, the second auxiliary air engine 42 and the third auxiliary air engine 44 can apply a thrust to forward movement of the airplane.

The main air engine 41, the first auxiliary air engine 31 and the second auxiliary air engine 42 can be arranged on a rocket, the design pressure of the compressed air in the expansion chamber 18 of the main air engine 41 can be obviously ≥20 MPa, higher than the maximum pressure of fuel gas in the combustion chamber of the rocket, and the main air engine 41 is light and simple in structure, also favorable for reducing the rocket's "mass ratio"; the first auxiliary air engine 31 and the second auxiliary air engine 42 are favorable for reducing air resistance and sliding friction with air before the rocket flies out of the atmosphere, making the rocket improving speed and energy-saving; moreover, the main air engine 41, the first auxiliary air engine 31 and the second auxiliary air engine 42 can apply a thrust to forward movement of the rocket.

The main air engine 41, the first auxiliary air engine 31 and the second auxiliary air engine 42, or a selective combination of them and a traditional technology engine, can be configured on a submarine; the first auxiliary air engine 31 is used for blowing away and sweeping off seawater in front of the submarine head, to form a conical low-pressure area 40 (even a vacuum area) in front of the submarine head; the second auxiliary air engine 42 are used for blowing away and sweeping off seawater close to the submarine body, to form a low-pressure air layer around the submarine body, so that the submarine in high pressure of seawater runs as in low-pressure air, the resistance of the seawater and the sliding friction between the submarine body and the seawater are reduced favorably, so that the submarine is speed-increasing, energy-saving and silent; the main air engine 41, the first auxiliary air engine 31 and the second auxiliary air engine 42 can apply a thrust to forward movement of the submarine.

The main air engine 41, the first auxiliary air engine 31 and the second auxiliary air engine 42, or a selective combination of them and a traditional technology engine, can be configured on a train; the first auxiliary air engine 31 is used for forming a conical low-pressure area 40 (even a vacuum area) in front of the train head, reducing the air resistance favorably, so that the train can increase speed and be energy-saving; the nozzles of the plurality of second auxiliary air engines 42 eject high-speed airflow to the back of the train (not shown in the figures), to form a low-pressure air layer around the train body, thereby reducing the sliding friction resistance with the air when the train runs forward; wherein, as to a train with airfoil protruding structures on two sides, the plurality of second auxiliary air engine 42 are arranged in front of the airfoil protruding structures and eject high-speed airflow to the surface of the rear train body, including the surfaces of the airfoil protruding structures, the upper surfaces of the airfoil protruding structures are raised in a streamline mode but the distances of protruding to the two sides are short, so that a lift force is generated by the airfoil protruding structures but is not sufficient to lift the train up, and the lift force generated when the high-speed airflow blows the surfaces of the airfoil protruding structures relieves the vertical pressure of the train on the rail, so that the rolling friction between the train wheels and the rail when the train advances is reduced, and the train is energy-saving and speed up favorably; moreover, the main air engine 41, the first auxiliary air engine 31 and the second auxiliary air engine 42 all apply a thrust to forward movement of the train; the fifth auxiliary air engine 47 used at the tail of the airplane above can be arranged at the tail of the train, and can eject air in a direction opposite to the running direction of the train when the train is decelerated and stops.

The system of using compressed air as force source in this embodiment has the following advantages:

1) The traditional technology jet engine is improved to the compressed air jet engine 14 of the present invention, i.e. internal combustion engine to no-combustion engine, thus avoiding side effects and troubles related to combustion:

(a) Avoiding to carry fuel and relevant combustion facilities, so that the whole machine of the compressed air jet engine 14 is lightened in weight, simplified in structure, lower in manufacturing cost, and favorable for its research-development, production, control and application.

(b) Avoiding to cause the technical problems corresponding to high combustion temperature:

The combustion temperature of fuel in the combustion chamber of a traditional technology jet engine can reach about 3500K (~5800° F.) and often exceeds the melting points of the combustion chamber and nozzle materials (except graphite and tungsten), and it must be ensured that these materials are not burnt, melted or boiled; under certain circumferential stress due to the high-temperature working environment, the tensile strength of a combustion chamber structural material is obviously reduced so that the design pressure borne by the combustion chamber is subject to certain restrictions; consequently cooling system is needed additionally for preventing overheating the materials, the common cooling modes include, for example, ablation cooling (the chamber wall has an ablation material, which can continually absorb heat and fall out), radiation cooling (the chamber wall reaches a white heat state to radiate heat), heat sink cooling (a propellant, generally liquid hydrogen, is poured down along the chamber wall), regenerative cooling (the propellant first flows through a cooling sleeve in the chamber wall before combustion), water curtain cooling (a propellant injector is specially arranged to reduce the temperature of fuel gas surrounding the chamber wall), film cooling (the chamber wall is soaked by the liquid propellant, and is cooled by evaporative heat absorption of liquid), transpiration cooling (a special form of film cooling) and the like, so that the engine is inevitably complex in structure, with weight increase among others, and these problems with high combustion temperature are related to the traditional technology jet engine, but not to the compressed air jet engine 14 of the present invention.

(c) Since the compressed air jet engines 14 of the present invention no longer eject high-temperature fuel-combustion gases, whereas eject high-speed airflow with relatively low temperature which does not result in ablation damage to the moving carrier and the like, the present invention can use the nozzle of each auxiliary air engine to eject high-speed airflow to cause regional aerodynamic change, thereby reducing air (or seawater) resistance and sliding friction resistance with air (or seawater), improving the lift force of airplane wings and achieving other functions.

2) Producing and supplying high/ultra-high pressure compressed air is economic and environment-friendly The traditional technology jet engine (including aviation jet engines and rocket engines) burns fuel to produce high-temperature and high-pressure gas by means of expansion, leading to three main problems: resource consumption, environmental pollution and greenhouse gas emission, wherein the working heights of the airplane and the rocket are high, so that the generated nitrogen oxides destroy the ozone layer more easily. In the present invention, the moving carriers, including airplanes, rockets, submarines, trains and the like, are driven by the compressed air jet engine 14 and powered by high/ultra-high pressure compressed air, so that when they run in the air, in the space, in the sea or on the ground, they realize zero emission and even do not consume resources.

In addition, even if inspecting the emission and cost during the production of the high/ultra-high pressure compressed air, the high/ultra-high pressure air compressor 50 (the working pressure is close to, equal to or more than 100 MPa) in the present invention can pressurize and charge air to the compressed air production/supply device 48 using night off-peak electric energy or those not easy to store, such as wind power, solar energy and the like; moreover, a large amount of heat energy (equivalent to 90% of the consumed electric energy) accompanied in the production process of the high/ultra-high pressure air in the large boiler-type pressure vessel 49 can be collected together for central heating.

Therefore, the system using compressed air as force source in the present invention is also quite economical, inexpensive, energy-saving and environment-friendly on the overall efficiency.

3) The expansion chamber 18 of the compressed air jet engine 14 of the present invention has the advantages in: high pressure, large thrust, safety and good seal:

(a) High Pressure and Large Thrust

Those skilled in the art know that the traditional technology jet engines such as rockets have combustion chamber working pressure between 1 MPa and 20 MPa, and that, generally, the higher the pressure is, the better the performance, and the larger the thrust relatively.

With the development of modern pressure vessels, pneumatic transmission elements and materials science, the output pressure of ultrahigh-pressure air compressors has reached >100 MPa, such as, the pressure p of ultrahigh-pressure vessels (Code U) among the pressure vessels is not lower than 100 MPa ($p \geq 100$ MPa), all far higher than 20 MPa.

Moreover, the large-capacity tubular containers 60 and the air storage pipes 1 in the present invention have long tubular structures, with their tube-diameters smaller than the inside diameters of high-pressure compressed air storage tanks of the same capacity and pressure in the traditional technology, so that they can tolerate and accommodate the compressed air with relatively higher pressure under the same material conditions, above-mentioned at least based on the formula of pressure bearable by tubes in material mechanics $$P=(2*\sigma/S*\delta)/D$$

where P is pressure, σ tensile strength, S safety coefficient, δ wall thickness, and D the tube outside diameter.

In addition, in the present invention, the high/ultrahigh-pressure compressed air is appropriately heated by the intake pipe electric heater 29 and the expansion chamber wall electric heater 30 during injection from the air storage pipe 1 to the expansion chamber 18 via the intake pipe 17, thus conducive for air-expansion to do work with higher thrust.

(b) Safety

Safety codes have been formulated for pressure vessels as a mature industry, defining that the legal working pressure is less than 40% of the rupture pressure of an air storage device, and that safety is reliable at 2.5 (i.e., the ratio of ultimate stress to allowable stress is 2.5);

For another example, the university textbook explicitly states the common characteristics of pneumatic transmissions using compressed air as a working medium: the pneumatic transmissions are fast in action, quick in response and strong in working environment adaptability, particularly capable to work safely and reliably under the severe conditions of high temperature difference, flammable and explosive, much dust, vibration and the like, and have the advantages in fire proofing, explosion protection, energy conservation, high efficiency and no pollution among others.

With the development of material science, the pressure vessels are often made of high-pressure resistant and lightweight carbon fibers, which are brittle and under ultrahigh pressure can be split, without producing any shrapnel, at most resulting in the situation that the shell made up of them is "broken" to let compressed air leak, thus avoiding the dangerous situations for fragments and high-pressure gas to splash, so that the safety is also relatively good.

(c) Good Seal

The valve sealing technology is more reliable with the development of pneumatic transmission technology, and those skilled in the art know a comparison that the air leak rate of a compressed air storage device is lower than the electricity gradually depleted rate of a storage battery even in the case without using electricity as the time extends.

4) Reducing the running resistance of the moving carrier, increasing its speed limit, saving energy, improving the lift force of airplane wings, and favorable for short-distance or vertical take-off/landing.

These advantages are related to the aerodynamic changes produced around the moving carrier according to the Bernoulli's principle when the de Laval nozzles 19 inject high-speed airflow 24, by using high/ultrahigh-pressure compressed air as force source instead of high-temperature fuel gas generated by combustion.

The de Laval nozzle invented by the Swede Gustav de Laval is recognized as a "flow rate increaser", and is widely applied as a nozzle of a rocket engine; in the present invention, the de Laval nozzle as mentioned above also plays a role of a "flow rate increaser", making the nozzle of the air engine 16 ejects high-speed airflow 24.

According to the Bernoulli's principle established by the "father of fluid mechanics" Daniel Bernoulli, the Bernoulli equation is expressed as follows:

$$\tfrac{1}{2}\rho v^2 + \rho gh + p = \text{constant}$$

where p is the pressure, v the velocity, ρ the density, g the gravitational acceleration, and h the elevation.

In a fluid system, e.g., in airflow or water flow, the higher the velocity is, the lower the pressure, as in fact the density of the fluid is simultaneously reduced.

Regarding this, the first auxiliary air engine 31, the second auxiliary air engines and the third auxiliary air engines 44 are additionally explained in brief:

(a) For the First Auxiliary Air Engine 31

As previously described, when the first auxiliary air engine vent 39, in front of the moving carrier within a certain distance and angle range, obliquely ejects high-speed airflow 24 to the surrounding of the moving carrier head 32, a conical low-pressure area 40 is formed in front of the moving carrier head 32, to which there is almost no resistance, while the first auxiliary air engine 31 with a raindrop shape 43 is set at the forefront of the moving carrier. According to the air resistance formula:

$$F = \tfrac{1}{2} C \rho S V^2$$

where, C is the drag coefficient, ρ the density of the fluid, S the cross sectional area and V the speed of the object relative to the fluid.

According to the formula, the air resistance borne by the first auxiliary air engine 31 with the raindrop shape 43 is analyzed: (1) the air drag coefficient is also referred to as an wind resistance coefficient, with its magnitude related to the shape of the object, while the raindrop shape has minimum wind resistance coefficient; (2) the cross sectional area (the windward area) of the first auxiliary air engine 31 with the raindrop shape 43 can be small, only several tenths to even several hundredths of the moving carrier head 32; and (3) the air resistance is related to air elasticity due to the air in front of the moving object compressed when the moving object runs, because the conical low-pressure area 40 outside surface, namely the conical side, is the high-speed airflow 24 ejected from the first auxiliary air engine 31 with the raindrop shape 43, and the flow rate of the high-speed airflow 24 is extremely high, always much higher than the velocity of the moving carrier, so that the air in front of the raindrop-shaped first auxiliary air engine 31 is not compressed, but "pulled" by the high-speed airflow 24 to flow backward therewith, and that the air density declines, thus favorable for the moving carrier to advance.

As we know, the air resistance borne by the moving carrier in air is proportional to the square of velocity; it is reported that the air resistance is proportional to the cube of velocity when the velocity reaches 400-600 m/s; and the air resistance may be directly proportional to the high power of velocity under the condition of higher velocity. Thus, how to reduce the air resistance for increasingly high-speed aeronautical and astronautic (before flying out of the atmosphere) airplanes is a non-negligible issue, and applying the first auxiliary air engine 31 to high-speed airplanes and rockets is particularly significant.

(b) For the Second Auxiliary Air Engines

When one object relatively moves on the surface of the other object, i.e. while moving in relative motion, the drag force that results from two surfaces being pressed against each other is referred to as sliding friction (or kinetic friction), which is directly proportional to the pressure, i.e. the vertical acting force of one object against the surface of the other object. Specifically, when moving in the seawater, the submarine is subjected to sliding friction applied to the surface of its body by the seawater and hindering its relative movement, and the sliding friction is directly proportional to the pressure of the seawater on the surface of the submarine body (as the normal force which direction is perpendicular to related surfaces). The sliding friction can be expressed by the sliding friction formula:

$$F=\mu F_N$$

where F is sliding friction, $F_N$ the normal force, and $\mu$ a dynamic friction factor.

When the second auxiliary air engine nozzles eject high-speed airflow backward relatively close and parallel to the surface of the submarine body (not shown in the figures), covering the surface, the flow rate is high while the pressure (the normal force) on the surface is low, and the high-speed airflow can blow away and sweep off the seawater close to the submarine body to form a low-pressure air layer around it, thus reducing the sliding friction resistance with the surrounding seawater when the submarine runs forward; and the second auxiliary air engines ejecting air backward also applies a certain thrust to the running of the submarine.

(c) For the Third Auxiliary Air Engines (44)

In the 1970s, the United States and the former Soviet Union successively launched a kind of airplane with engines above the wings, respectively an experimental Boeing YC-14 (canceled for various reasons) and $A_{HTOHOB}$ $A_H$-72, and the air flow ejected by such engines directly blows through the upper surfaces of the wings to accelerate the air flow on the upper surfaces of the wings and increase the lift force, thereby realizing short-distance take-off and landing. The distinguishing technical features between this technology (hereinafter collectively referred to as $A_H$-72 technology) and the third auxiliary air engine 44 of the present invention are as follows:

(1) The $A_H$-72 engine is powered by fuel gas generated by fuel combustion (belonging to an internal combustion engine), and the third auxiliary air engine 44 of the present invention is powered by compressed air (belonging to a new type "no-combustion engine");

(2) The high-temperature fuel gas ejected by the $A_H$-72 engine may result in a certain degree of burning corrosion and structural thermal fatigue on the surfaces of the wings (the material-requirement for the wing is too high, and the cost is too expensive), whereas the high-speed airflow ejected by the third auxiliary air engine 44 of the present invention does not result in the above-mentioned ablation and damage on the surfaces of the wings;

(3) The $A_H$-72 engines are arranged above the wings, and the third auxiliary air engines 44 of the present invention are arranged in the front of the leading edges of the wings;

(4) The effect of the $A_H$-72 engines on the lift force of the wings is mainly produced on the upper surfaces of the wings, whereas the effect of the third auxiliary air engines 44 of the present invention on the lift force of the wings is produced not only on the upper surfaces of the wings but also on the lower surfaces of the wings with certain angles of attack, so the efficiency is higher;

(5) The $A_H$-72 engines above the wings, namely main propulsive engines of the airplane, need to continuously work (cannot stop even if it is not needed to continue to improve lift during cruise, with high temperature fuel gas continuously blowing the upper surfaces of the wings), whereas the third auxiliary air engines 44 of the present invention only need to work for short time during lifting (the airplane is additionally provided with a main propulsive engine);

(6) The $A_H$-72 voyage is limited (the maximum payload voyage is 800 km), whereas the third auxiliary air engines 44 of the present invention are generally irrelevant to the voyage (the airplane is additionally provided with a main propulsive engine);

(7) The "the ratio of air velocity to airplane velocity" of the $A_H$-72 airplane is roughly kept at a relatively stable value, whereas the "the ratio of air velocity to airplane velocity" of the airplane with the third auxiliary air engines 44 of the present invention can rise during take-off and landing (when the third auxiliary air engines 44 work) and is usual at other time.

This embodiment describes an operating method of the system using compressed air as force source, including the following steps:

Step 1: air is compressed and charged to the large boiler-type pressure vessel 49 by the high/ultrahigh-pressure air compressor 50.

In this step, the manifold inlet valves 67 as well as all of the inlet valves 78 and the outlet valves 79 of the large-capacity tubular containers are opened, and the manifold outlet valves 70 are closed.

The motor 51 utilizes night off-peak electricity or power not easy to store, such as wind power, solar energy and the like, and the high/ultrahigh-pressure air compressor 50 pressurizes and charges air into the intake manifolds 65, all the large-capacity tubular containers 60 and the exhaust manifolds 68 arranged in the large-scale flowing water tank 54 via the air compressor discharge port 52, the manifold inlet 66 and the manifold inlet valve 67 thereof, all the large-capacity tubular vessel inlets 76 and the opened inlet valves 78 thereof as well as all the large-capacity tubular vessel outlets 77 and the opened outlet valves 79 thereof.

The controller controls the pressure and quantity of air charged from the air compressor discharge port 52 to adapt to the water flow rates of cooling water 58 flowing in from the water inlet 55 of the large-scale flowing water tank 54 and hot water 59 flowing out of the water outlet 56, so that the heat by-produced during the production process of compressed air in the intake manifolds 65, all the large-capacity tubular containers 60 and the exhaust manifolds 68 is taken away by the cooling water 58 in time, which is heated to become hot water 59 with appropriate temperature, timely flowing out of the water outlet 56 and arriving at the underground directly-buried heat preservation pipe 57 for central heating, until a large amount of compressed air still basically kept at normal temperature in the intake manifolds 65, all the large-capacity tubular containers 60 and the exhaust manifolds 68 reaches the designed high pressure, and the compressed air is then stored for later use;

Then, the manifold inlet valves 67 as well as the inlet valves 78 and the outlet valves 79 of all the large-capacity tubular containers 60 are closed, and the manifold outlet valves 70 are continuously closed.

Step 2: air is charged to the air tank 9 by the large boiler-type pressure vessel 49.

In this step, the manifold inlet valves 67 and the inlet valves 78 of all the large-capacity tubular containers 60 are closed, only one of the outlet valves 79 of all the large-capacity tubular containers 60 is separately orderly opened while the rest outlet valves 79 are closed, and the manifold outlet valves 70 are opened; the manifold outlet 69 is connected with the air reception pipe 3 shared by the air storage pipes 1 in the air tank 9, and only one of the intake valves 5 of the air storage pipes 1 in the air tank 9 is separately opened in order while the rest intake valves 5 are closed; the controller controls the compressed air to be charged to an air storage pipe 1 orderly from the opened outlet valve 79 of a large-capacity tubular container 60 via the opened manifold outlet valve 70, the manifold outlet 69, the air reception pipe 3 shared by the air storage pipes 1 in the air tank 9 and a opened air storage pipe intake valve 5, . . . for example, the compressed air is input to the air storage pipe A 10 from large-capacity tubular container A 62, the intake valve 5 of the air storage pipe A 10 is closed when it is full of the compressed air reaching the design requirement pressure, then the intake valve 5 of the air storage pipe B 11 is opened, the compressed air is input to the air storage pipe B 11 from the large-capacity tubular container A 62 . . . .

In the process of charging air to the air storage pipes 1 one after another from one of large-capacity tubular containers 60, in which the air pressure gradually declines, so that when an air storage pipe 1 is charged with air later, the air pressure in the large-capacity tubular container 60 declines to be equal to the air pressure gradually increased in the air storage pipe 1 charged with air, then the large-capacity tubular container 60 cannot continuously deliver air to the air storage pipe 1 but the air pressure in the air storage pipe 1 does not rise to the design requirement, for example, such a situation happens in the process of delivering air from large-capacity tubular container A 62 to air storage pipe C 12, when the air pressures of the both are equal after the former declines and the latter rises, the air pressure in the air storage pipe C 12 does not rise to the design requirement while the air pressure in the large-capacity tubular container A 62 has declined to a certain value and the large-capacity tubular container A 62 cannot continuously deliver air to the air storage pipe C 12 in which the air pressure has raised to a certain value, then the controller controls the intake valve 5 of the air storage pipe C 12 to be closed, the intake valve 5 of the air storage pipe D 13, the intake valve 5 of the air storage pipe E 13a and the like are orderly opened and closed in succession, so that the compressed air under certain remaining pressure in the large-capacity tubular container A 62 is continuously flowed into the air storage pipe D 13, the air storage pipe E 13a and the like with relatively low air pressure, then the outlet valve 79 of the large-capacity tubular container A 62 is closed, the outlet valve 79 of large-capacity tubular container B 63 is opened, meanwhile, the intake valve 5 of the air storage pipe C 12 is reopened, so that the large-capacity tubular container B 63 with "original" high pressure charges air to the air storage pipe C 12 with relatively lower pressure in comparison with the large-capacity tubular container B 63 so that the air pressure rising to a certain value in the air storage pipe C 12 continuously rises to the design requirement, then the intake valve 5 of the air storage pipe C 12 is closed, next, the intake valve 5 of air storage pipe D 13 is opened, . . . .

Wherein, in the process of delivering the compressed air from the large-capacity tubular containers 60 to the air storage pipes 1, the air stored in the air storage pipes 1 with rising air pressure thus has a warming trend, whereas the compressed air delivered from the large-capacity tubular containers 60 into the air storage pipes 1 with relatively declining air pressure thus has a cooling trend, and the controller controls the flow rate and the velocity of the compressed air delivered from the large-capacity tubular containers 60 to the air storage pipes 1, so that in the process, the air pressure in the air storage pipes 1 stably rises to the design requirement, the warming and cooling trends are relatively balanced, and the air temperature is basically stable.

Step 3: the air tank 9 delivers air to the air engine 16.

During working process of air engine 16, the intake valves 5 of all the air storage pipes 1 in the air tank 9 are closed, and one or several of exhaust valves 6 of the air storage pipes 1 in the air tank 9 are separately opened in order while the rest exhaust valves 6 are closed; the controller controls the compressed air to be delivered orderly from the opened exhaust valves 6 of one or several air storage pipes 1 and the air delivery pipe 8 to the intake pipe 17 connected to the air delivery pipe 8, and then the compressed air is injected into the expansion chamber 18 via the air injection vent 25 installed at the expansion chamber head 27 and the air injection adjuster 26.

The diameter of the intake pipe 17 is smaller than that of the air storage pipes 1, the intake pipe electric heater 29 and the expansion chamber wall electric heater 30 work, the compressed air entering the expansion chamber 18 is appropriately heated to keep higher pressure, then the compressed air flows to the de Laval nozzle convergent section 20 integrally connected with the end of the expansion chamber 18 under high pressure, passes through the de Laval nozzle throat 21 and is ejected from the de Laval nozzle divergent section 22, the air flow is greatly accelerated to produce a huge thrust, and the high-speed airflow 24 also causes the relevant regional aerodynamic changes.

Described above are merely preferred implementations of the present invention. It should be pointed out that many improvements and substitutions can also be made by those of ordinary skill in the art without departing from the technical principle of the present invention, and these improvements and substitutions shall fall into the protection scope of the present invention.

The invention claimed is:

1. A system of using compressed air as force source, wherein the system comprises compressed air jet engines, which is to use high/ultra-high pressure compressed air as a jet working medium, a compressed air production/supply device and a controller; wherein:

the compressed air jet engines are equipped on a moving carrier; the compressed air jet engines comprise an air tank and air engines; the air tank is a compressed air storage container, including a plurality of air storage pipes to store and supply the compressed air needed for the air engines; the air engines comprise a main air engine and a plurality of auxiliary air engines; the main air engine is to use the compressed air input from the plurality of air storage pipes as the jet working medium for applying a thrust to the moving carrier moving forward; the plurality of auxiliary air engines arranged respectively around the moving carrier include a first auxiliary air engine, a second auxiliary air engine, a third auxiliary air engine, a fourth auxiliary air engine and a fifth auxiliary air engine, to use the compressed air input from the plurality of air storage pipes as the jet working medium, in coordination with the main air engine for pushing the moving carrier moving toward a target direction;

the compressed air production/supply device comprises a high/ultra-high pressure air compressor and a large boiler-type pressure vessel; a working pressure of the high/ultra-high pressure air compressor is close to, equal to or more than 100 Mpa, for pressurizing and inflating air into the large boiler-type pressure vessel under the control of the controller; the large boiler-type pressure vessel is for being used to produce and store the compressed air for pressurizing and inflating the compressed air into the plurality of air storage pipes; the large boiler-type pressure vessel is arranged on or under the ground or in a separate vehicle different from the moving carrier; after the compressed air is supplied from the large boiler-type pressure vessel to the plurality of air storage pipes, the large boiler-type pressure vessel is disconnected from the plurality of air storage pipes; and the controller is for being used to control the opening and closing of the main air engine, the first auxiliary air engine, the second auxiliary air engine, the third auxiliary air engine, the fourth auxiliary air engines and the fifth auxiliary air engine for pushing the moving carrier moving toward the target direction.

2. The system of using compressed air as force source according to claim 1, wherein each of the main air engine, the first auxiliary air engine, the second auxiliary air engine, the third auxiliary air engine, the fourth auxiliary air engines and the fifth auxiliary air engine comprises a high pressure-resistant, lighter material intake pipe, an expansion chamber and a de Laval nozzle;

the intake pipe is connected to the air storage pipe and the expansion chamber and surrounded with an intake pipe electric heater, for heating the compressed air in the intake pipe to increase the air pressure within the intake pipe; the compressed air in the air storage pipe is injected into the expansion chamber through an air injection vent of the intake pipe;

an expansion chamber wall of the expansion chamber is equipped with an air injection adjuster for modulating the amount of compressed air at a set pressure injected from the intake pipe into the expansion chamber to maintain the pressure within the expansion chamber at the set pressure; surrounding the expansion chamber there is an expansion chamber wall electric heater to heat the compressed air entering the expansion chamber for pressurization;

a cross-sectional area of the de Laval nozzle is first converged and then diverged; a rear of the expansion chamber is integrally connected with a de Laval nozzle convergent section; the compressed air from the expansion chamber is accelerated under pressure to pass through the de Laval nozzle convergent section, a de Laval nozzle throat and a de Laval nozzle divergent section; and at last a high-speed airflow is ejected from a de Laval nozzle orifice.

3. The system of using compressed air as force source according to claim 2, wherein the first auxiliary air engine is equipped at a front of a moving carrier head; a cross section area of the first auxiliary air engine is smaller than that of the corresponding moving carrier head; the first auxiliary air engine comprises a first intake pipe, a first expansion chamber and a first de Laval nozzle, as well as a firm tubular structure, through which the first auxiliary air engine is fixed at the front of the moving carrier head; the first intake pipe is located within the firm tubular structure, and supported by the firm tubular structure; a rear of the first expansion chamber is integrally connected with a first de Laval nozzle convergent section; the whole first de Laval nozzle has a de Laval nozzle-like structure from front to rear; the first intake pipe, along with the firm tubular structure, extends forward from the moving carrier head, and forward passes through a first auxiliary air engine nozzle, a first de Laval nozzle divergent section, a first de Laval nozzle throat, the first de Laval nozzle convergent section and the first expansion chamber in sequence along with an axial center of the first auxiliary air engine to be fixedly connected with a first expansion chamber head inner wall, on which a first air injection vent and the air injection adjuster are equipped; the compressed air in the first expansion chamber is accelerated under the pressure to pass through the first de Laval nozzle convergent section, the first de Laval nozzle throat, and finally a gap located between the first de Laval nozzle divergent section and a conical widened portion of the firm tubular structure, ejecting backwards around the moving carrier head, along one conical side; the generatrix of the conical side is equivalent to a connection line from the first de Laval nozzle throat to a periphery of the moving carrier head, to form a conical low-pressure area in front of the moving carrier head for reducing air resistance or seawater resistance when the moving carrier moves forward; and the first auxiliary air engine is also for being used to apply a thrust for forward movement of the moving carrier.

4. The system of using compressed air as force source according to claim 3, wherein several second auxiliary air engines are placed around the moving carrier with their nozzles toward a rear of the moving carrier to eject high-velocity airflow for applying thrust to the moving carrier forward; and the high-velocity airflow ejected by the nozzles of the second auxiliary air engines is parallel and close to a surface of the moving carrier, so that a low-pressure air layer is formed around the moving carrier, thus reducing sliding friction resistance between the moving carrier and its surroundings when it moves forward.

5. The system of using compressed air as force source according to claim 1, wherein the moving carrier is equipped with one or more air tanks, in each of the one or more air tanks there are several air storage pipes which have a long tubular structure with a cylindrical air storage pipe wall made of high-pressure resistant and lighter materials; the air storage pipes are arranged in bundle and parallel with its whole cross section as a plum-like structure; each of the air storage pipes is equipped with an intake valve and an exhaust valve, which opening and closing are individually controlled by the controller;

around the air storage pipes backup electric heaters are arranged, to start when the compressed air jet engine overworks for some reason, and when the compressed air pressure in all of the air storage pipes is lower than a set limit;

one ends of the air storage pipes are communicated with an air reception multi-way pipe, converging into an air reception pipe; another ends of the air storage pipes are communicated with an air delivery multi-way pipe, converging into an air delivery pipe; the air storage pipes are communicated through the air delivery pipe with the intake pipe; and the air reception pipe is for being used for receiving compressed air pressurized and inflated from the large boiler-type pressure vessel.

6. The system of using compressed air as force source according to claim 1, wherein the large boiler-type pressure vessel for compressing and charging air to the plurality of air storage pipes in the air tank includes a large-scale flowing water tank and a plurality of large-capacity tubular containers and manifolds placed in the water tank;

the plurality of large-capacity tubular containers are distributed into several groups of row tubes, and the manifolds are placed on both sides of each groups of row tubes; every large-capacity tubular container arranged in a form of row tubes has two ends equipped with an inlet and an outlet; the manifold communicated with the inlets of the large-capacity tubular containers in a group is an intake manifold, and the manifold communicated with the outlets of the large-capacity tubular containers in a group is an exhaust manifold; the inlet of the large-capacity tubular container is equipped with an inlet valve, and the outlet of the large-capacity tubular container is equipped with an outlet valve; the intake manifold is equipped with a manifold inlet and a manifold inlet valve, and the exhaust manifold is equipped with a manifold outlet and a manifold outlet valve;

a volume and a pressure of the large-capacity tubular container are respectively greater and higher than those of the plurality of air storage pipes; some large-capacity tubular containers are serpentine pipes, in a tubular structure circuitously extending many times within the plane of row tubes;

the row tubes spreading in one plane, as well as the intake manifold and exhaust manifold on the two sides of the row tubes, constitute a large-capacity tubular container plane; in the large-scale flowing water tank there are several large-capacity tubular container planes, the intake manifolds of these large-capacity tubular container planes are communicated through several intake manifold communication tubes and share one manifold inlet equipped with a corresponding manifold inlet valve, and the exhaust manifolds of these large-capacity tubular container planes are communicated through several exhaust manifold communication tubes and share one manifold outlet equipped with a corresponding manifold outlet valve;

the large-scale flowing water tank is equipped with a water inlet for the inflow of cooling water and a water outlet for the outflow of hot water, which is communicated with an underground buried insulating pipework in a central heating system; and an air compressor discharge port of the high/ultra-high pressure air compressor is detachably connected to the manifold inlet for pressurizing and inflating air into the large-capacity tubular container.

7. An airplane wherein the airplane comprises the system of using compressed air as force source according to claim 1, wherein the first auxiliary air engine is placed in front of an airplane head, the second auxiliary air engines are placed on a peripheral side of an airplane fuselage, and a plurality of third auxiliary air engines are placed symmetrically in front of wings on both sides of the airplane; nozzles of the plurality of third auxiliary air engines eject high speed airflow back towards the wings, and a direction of the high-speed airflow is same as a direction of airflow towards the wings during airplane rolls for takeoff; the plurality of third auxiliary air engines are for being used for increasing a lift force of airplane wings to facilitate a short-range or vertical takeoff/landing, as well as for applying the thrust for the airplane moving forward corresponding to reaction forces of the airflow ejected from the nozzles of the plurality of third auxiliary air engines.

8. The airplane according to claim 7, wherein the fourth auxiliary air engine is placed below the airplane fuselage, for ejecting the airflow to a rear or front lower direction below the airplane, in order to apply counteraction forces toward a front or rear up direction above the airplane; fifth auxiliary air engines are placed just beneath an airplane tail, or symmetrically on both sides of the tail, for ejecting high velocity airflow in a reverse direction of an airplane flight, in order to play a role in buffering and deceleration on a flight of the airplane.

9. The system of using compressed air as force source according to claim 1, wherein:

the large boiler-type pressure vessel comprises a large-scale flowing water tank;

the large-scale flowing water tank is provided with a water inlet for an inflow of cooling water; and when the large boiler-type pressure vessel produces the compressed air, heat is accompanied in a production process of the compressed air, and heat exchange occurs between the heat and the cooling water flowing into the large-scale flowing water tank.

10. The system of using compressed air as force source according to claim 9, wherein:

the large-scale flowing water tank is provided with a water outlet for an outflow of hot water; and when the large boiler-type pressure vessel produces the compressed air, the heat exchange produces the hot water.

11. The system of using compressed air as force source according to claim 1, wherein:

the large boiler-type pressure vessel comprises a manifold outlet, through which the compressed air is for being inflated into the plurality of air storage pipes.

12. The system of using compressed air as force source according to claim 1, wherein:

the large boiler-type pressure vessel comprises a water tank, a water inlet, and a water outlet;

the water inlet is arranged for an inflow of cooling water; and the water outlet is arranged for an outflow of hot water.

13. The system of using compressed air as force source according to claim 12, wherein:

the water outlet is configured to be coupled to an underground buried insulating pipework; and when the large boiler-type pressure vessel produces the compressed air, heat is generated resulting in the hot water, and the water outlet is configured to allow the hot water to flow into the underground buried insulating pipework.

14. A method of operating the system of using compressed air as force source according to claim 1, wherein the method comprises the following steps:

step one: pressurizing and inflating air into a large boiler-type pressure vessel by the high/ultra-high pressure air compressor; wherein:

during this process, a manifold inlet valve, all of inlet valves and outlet valves of large capacity tubular containers are open while manifold outlet valves are closed;

a motor utilizes night off-peak electricity or power not easy to be stored, to drive the high/ultra-high pressure air compressor for pressurizing and inflating air, through an air compressor discharge port, a manifold inlet and its opened manifold inlet valve, all of large tubular container inlets and their opened inlet valves, and all of large tubular container outlets and their opened outlet valves into intake manifolds located in a large-scale flowing water tank, all of the large-capacity tubular containers and exhaust manifolds;

while the controller controls the pressure and the quantity of the air filled from the air compressor discharge port to adapt to the water flow rates of cooling water flowing from a water inlet and of hot water flowing out of a water outlet of the large-scale flowing water tank, so that the heat, produced during production of compressed air in the intake manifolds, all of the large-capacity tubular containers and the exhaust manifolds, is timely carried away by the cooling water, which is heated to become the hot water at an appropriate temperature in due course flowing from the water outlet to an underground buried insulating pipework for central heating, until a large amount of compressed air in the intake manifolds, all of the large-capacity tubular containers and the exhaust manifolds, while still basically remaining a normal temperature, reaches a pressure as designed to store for backup;

then the manifold inlet valves, all of the inlet valves and the outlet valves of all of the large-capacity tubular containers are closed, while the manifold outlet valves remain closed;

step two: inflating air from a large boiler-type pressure vessel into air tank; wherein:

during this process, the manifold inlet valves and the inlet valves of all of the large-capacity tubular containers are closed, only a single one of the outlet valves of all of the large-capacity tubular containers is separately orderly opened but the rest of the outlet valves are closed, while the manifold outlet valves are opened; a manifold outlet is connected with an air reception pipe shared by the plurality of air storage pipes in the air tank while only a single one of intake valves of the plurality of air storage pipes in the air tank is open respectively and orderly, while the other intake valves are closed;

the controller controls the compressed air orderly from the opened outlet valve of the large-capacity tubular container, through the opened manifold outlet valve, the manifold outlet, the air reception pipe shared by the plurality of air storage pipes in the air tank and an opened air storage pipe intake valve to fill that air storage pipe;

during the process of filling one by one of the plurality of air storage pipes with compressed air from the large-capacity tubular container, in which an air pressure gradually drops down, so that, later when an air storage pipe is in turn to be filled, the air pressure within the large-capacity tubular container has fallen to be equal to the air pressure gradually increased in the air storage pipe, to make the large-capacity tubular container unable to continue any longer to output air into the air storage pipe in which air pressure is yet to rise to a designed condition, then the controller controls opening and closing of the outlet valves of the large-capacity tubular container and the intake valves of the plurality of air storage pipes to let the large-capacity tubular container under a reduced air pressure fill the other air storage pipes which have not been inflated or have a relatively lower air pressure, and to let the air storage pipes, with air pressure increased through inflation but yet to rise to the designed condition, have the large-capacity tubular container under initially or relatively higher air pressure to fill them;

wherein, during the process of inflating compressed air from the large-capacity tubular container into the plurality of air storage pipes, air in the plurality of air storage pipes with increasing air pressure thus has a warming trend, whereas the compressed air input from the large-capacity tubular container into the plurality of air storage pipes with relatively decreasing air pressure thus has a cooling trend; the controller controls the flow and velocity of compressed air input from the large-capacity tubular container into plurality of air storage pipes so that, during the process, the pressure in the plurality of air storage pipes is increased gradually to a designed condition simultaneously making warming and cooling trends relatively balanced at a basically stable temperature;

step three: inflating air from the air tank into the air engine; wherein:

during an operation of the air engine, all of the intake valves of all of the plurality of air storage pipes in the air tank are closed, only one or several of exhaust valves of all of the plurality of air storage pipes in the air tank are open respectively and orderly while the rest of the exhaust valves are closed; the controller controls compressed air injection orderly from one or several opened exhaust valves of the plurality of air storage pipes and an air delivery pipe into a connected intake pipe, and through an air injection vent installed at an expansion chamber head and an air injection adjuster into an expansion chamber;

the diameter of the intake pipe is smaller than that of the air storage pipe; as an intake pipe electric heater and an expansion chamber wall electric heater are working, compressed air entering the expansion chamber is moderately heated to maintain a relatively higher pressure, and under higher pressure it flows in turn into a de Laval nozzle convergent section connected with the end of the expansion chamber, then through a de Laval nozzle throat and a de Laval nozzle divergent section to eject out, thus being accelerated to generate a thrust; such high-speed airflow ejected out also affects changes of relevant local aerodynamics.

\* \* \* \* \*